US007050664B2

(12) United States Patent
Kondo

(10) Patent No.: US 7,050,664 B2
(45) Date of Patent: May 23, 2006

(54) ON-CHIP OPTICAL INTERCONNECTION CIRCUIT, ELECTRO-OPTICAL DEVICE, AND ELECTRONIC APPARATUS

(75) Inventor: Takayuki Kondo, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 152 days.

(21) Appl. No.: 10/722,434

(22) Filed: Nov. 28, 2003

(65) Prior Publication Data

US 2004/0131304 A1 Jul. 8, 2004

(30) Foreign Application Priority Data

Dec. 6, 2002 (JP) ............................. 2002-355344

(51) Int. Cl.
*G02B 6/12* (2006.01)

(52) U.S. Cl. ............................. 385/14; 385/15; 385/89; 385/129

(58) Field of Classification Search .................. 385/14, 385/15, 27, 37, 88, 89, 129, 130, 147; 398/82
See application file for complete search history.

(56) References Cited

U.S. PATENT DOCUMENTS 5,262,656 A * 11/1993 Blondeau et al. ......... 385/14 X
2004/0136715 A1* 7/2004 Kondo ........................ 398/82

* cited by examiner

*Primary Examiner*—Phan Palmer
(74) *Attorney, Agent, or Firm*—Oliff & Berridge, PLC

(57) ABSTRACT

To provide an on-chip optical interconnection circuit, an electro-optical device, and an electronic apparatus, in which high signal transmission speed, easy miniaturization, and easy fabrication can be attained, there are provided a plurality of circuit blocks, which are provided on one integrated circuit chip, and an optical waveguide, which is provided on the integrated circuit chip to optically connect the circuit blocks to each other.

21 Claims, 22 Drawing Sheets

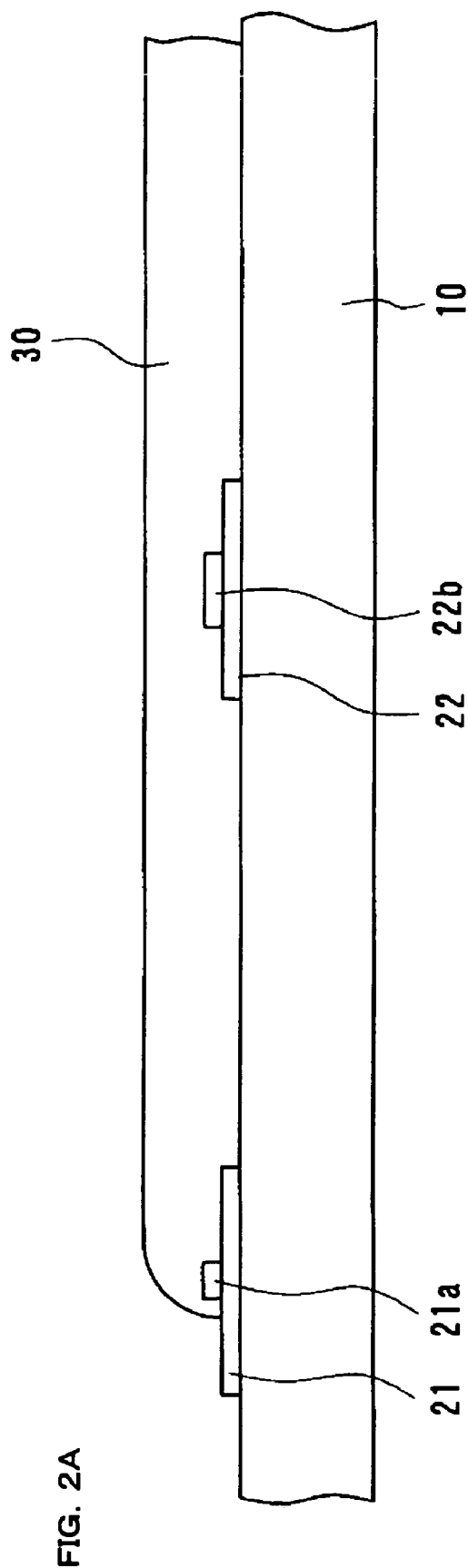
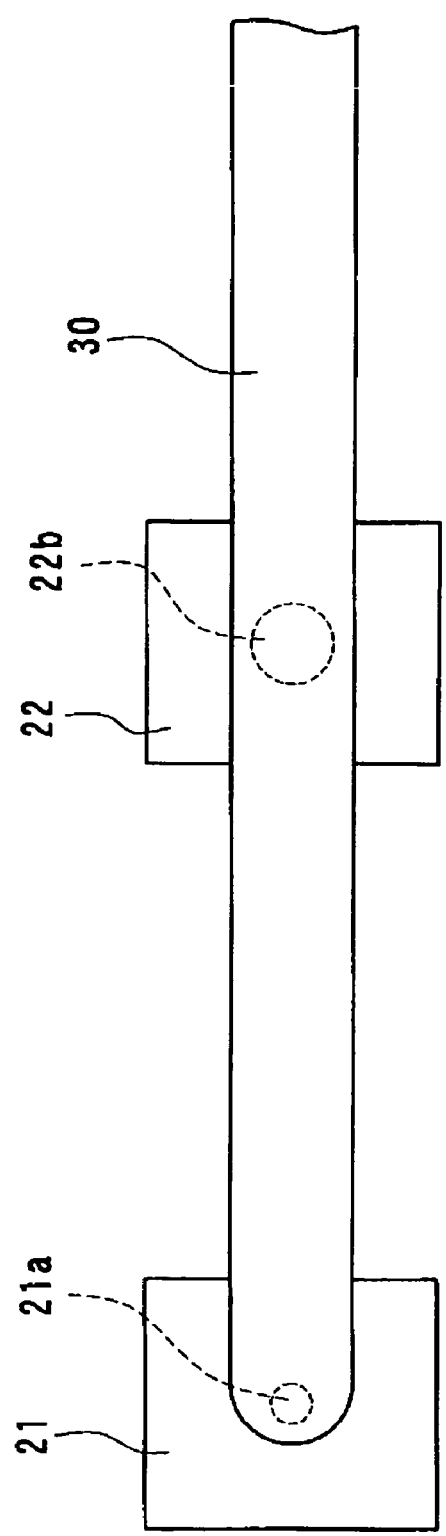
FIG. 2A
FIG. 2B

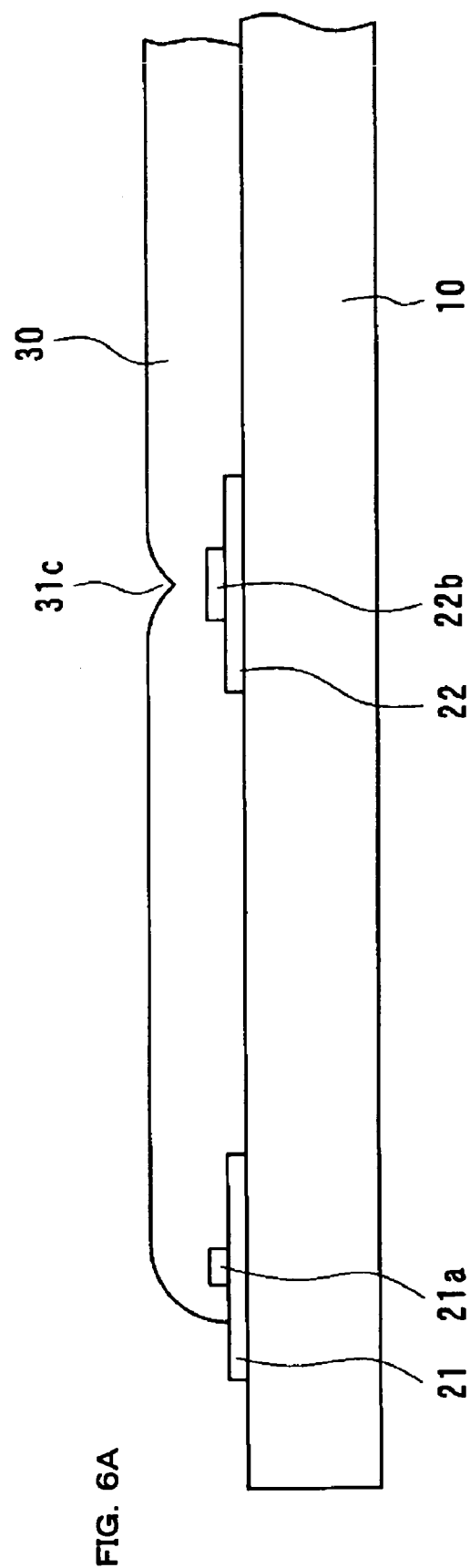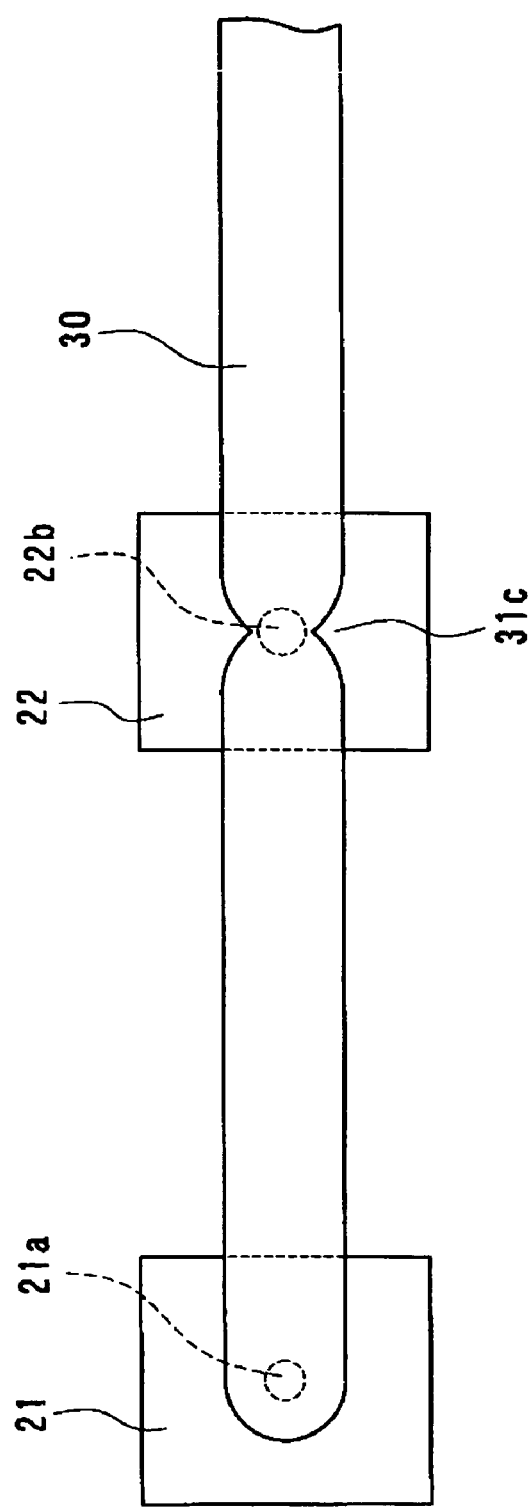
FIG. 6A
FIG. 6B

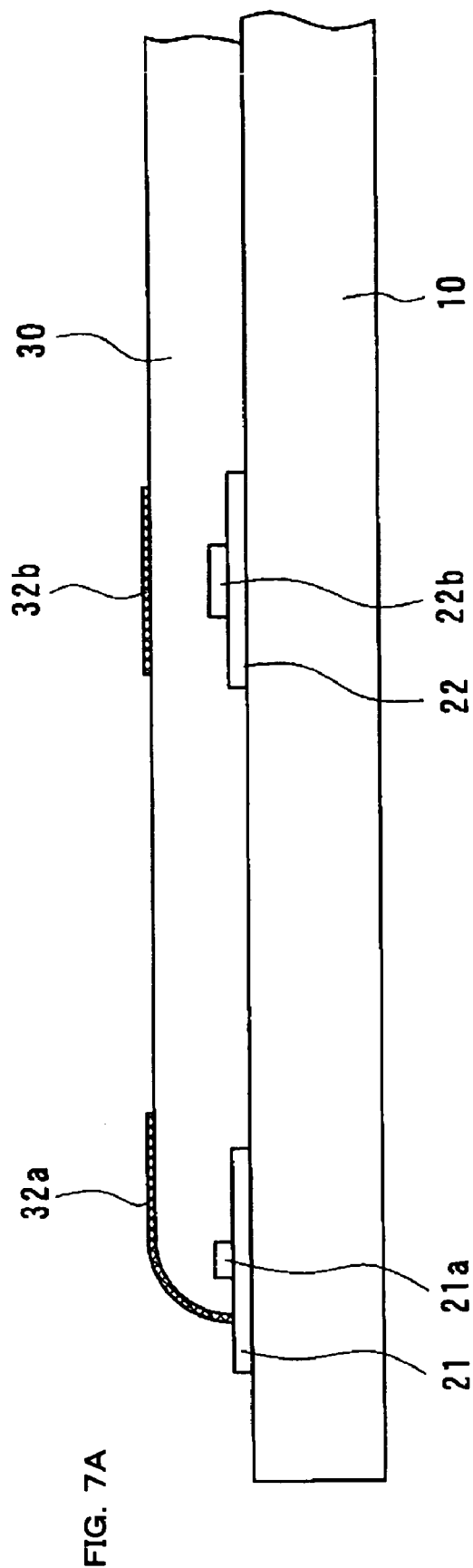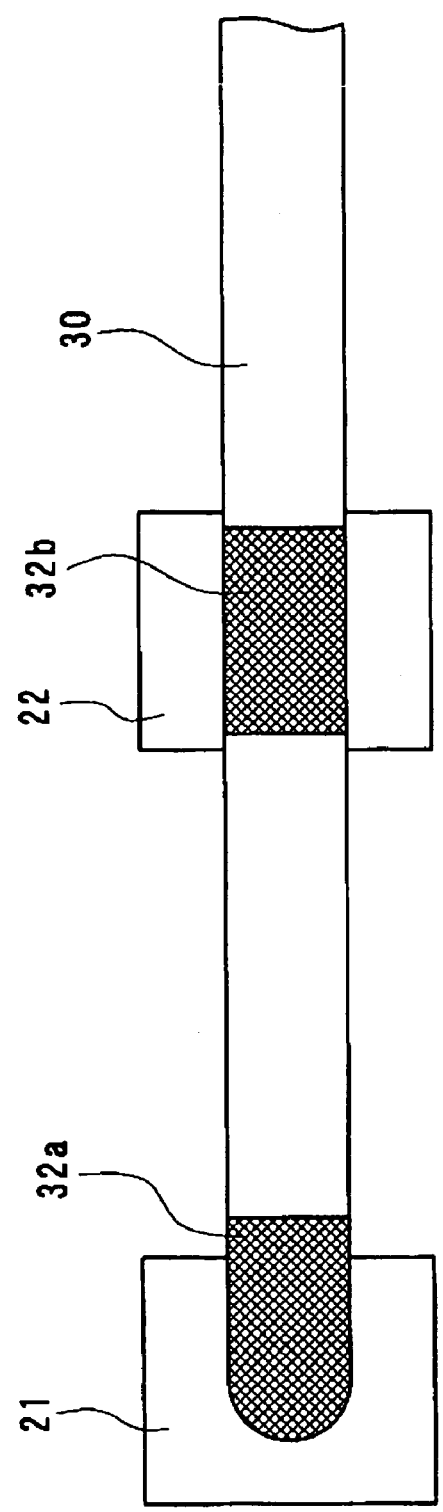

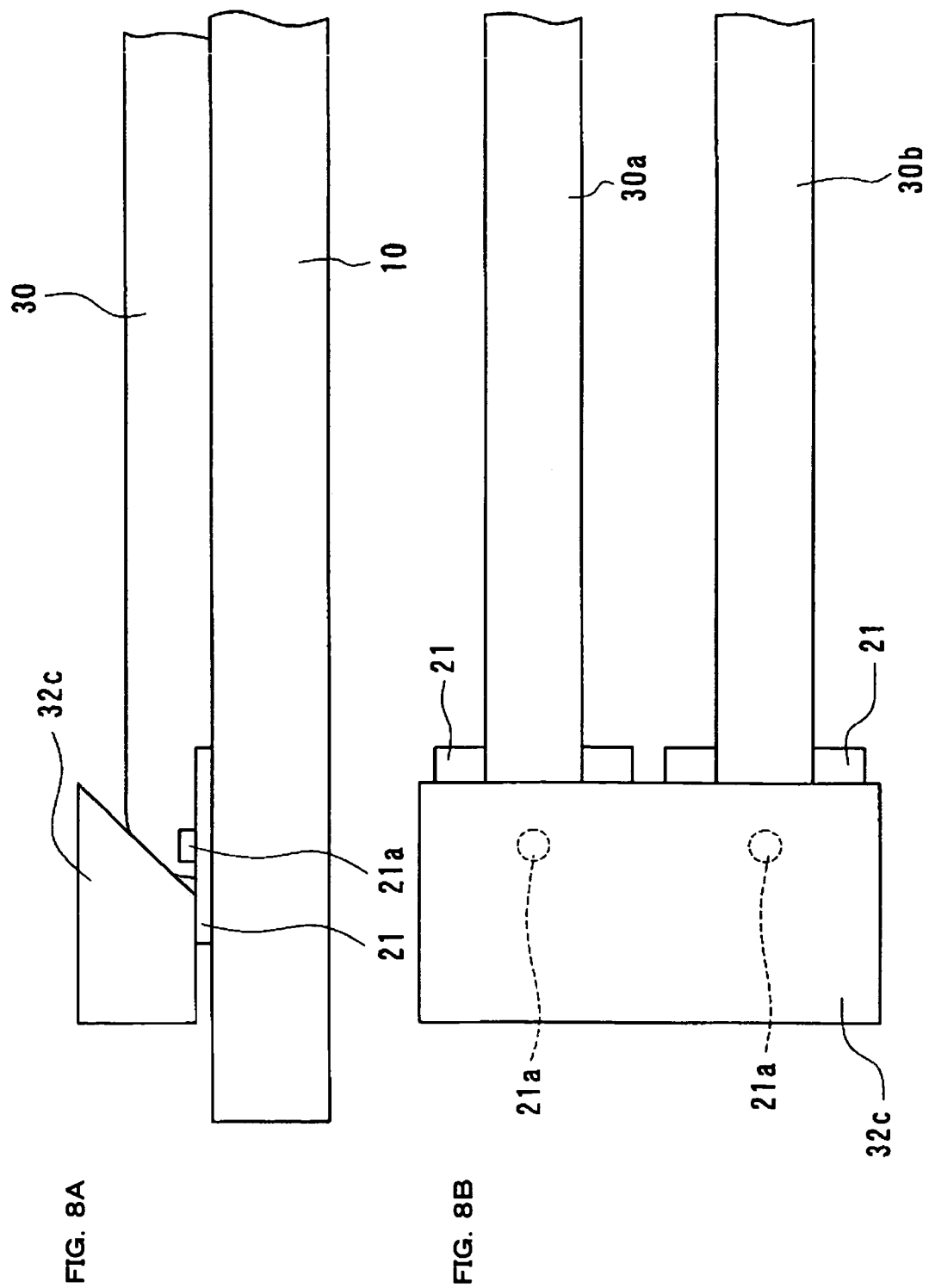

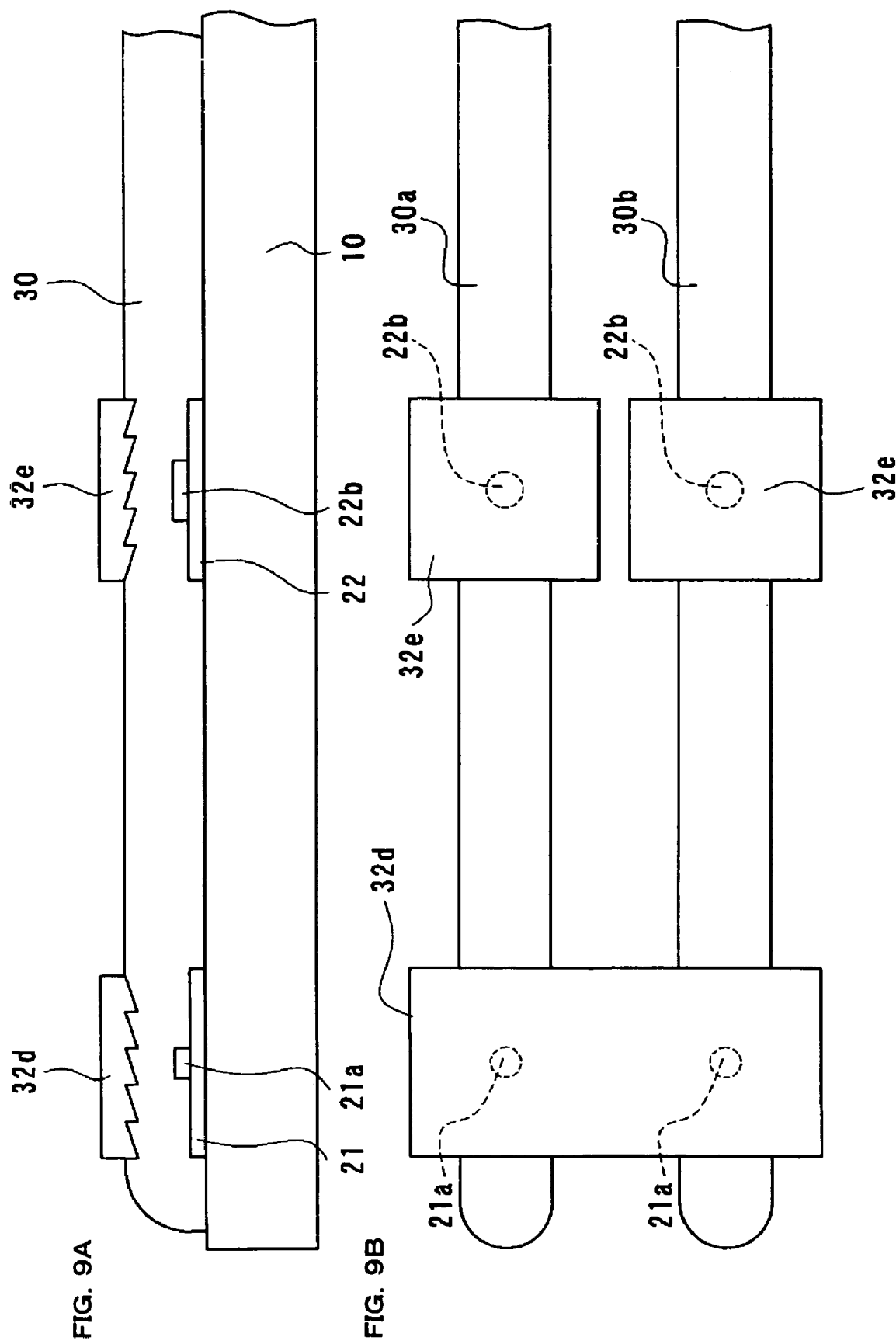

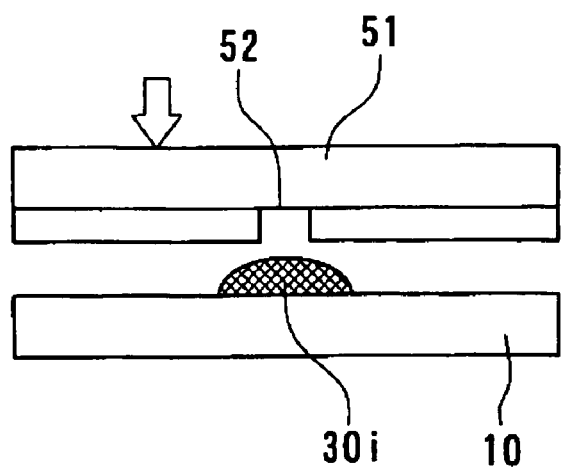 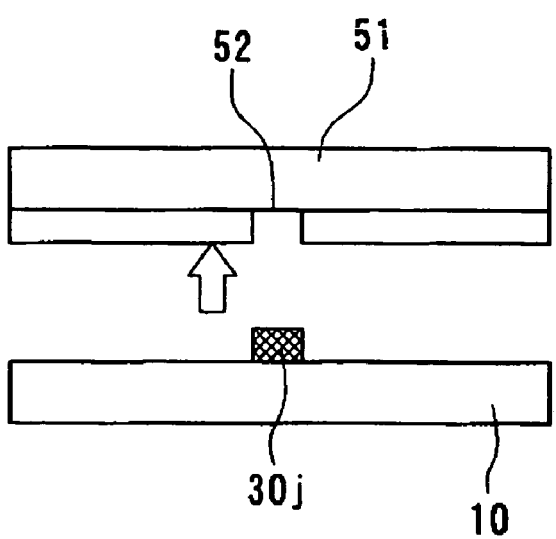

ON-CHIP OPTICAL INTERCONNECTION CIRCUIT, ELECTRO-OPTICAL DEVICE, AND ELECTRONIC APPARATUS

BACKGROUND OF THE INVENTION

1. Field of Invention

The present invention relates to an on-chip optical interconnection circuit, an electro-optical device, and an electronic apparatus.

2. Description of Related Art

Originally, LSIs (Large Scale Integrated circuits) made progress as integrated circuits having specific functions, such as DRAM (Dynamic Random Access Memory) or MPU (Micro Processing Unit), but with the speedup of MPUs, SRAMs (Static Random Access Memories), used as high-speed cache memories, there has been increased integration into the same chip. Now, by integrating flash memory, DSP (Digital Signal Processor), DRAM, etc. into one chip, the LSIs are being developed into high-performance information processing systems.

An LSI, where integrated circuits having such various functions are formed in the same chip, is called as a system-on-chip (SOC: System On Chip). In such SOC, integrated circuits (circuit blocks) having different functions are formed on one chip in a plane, and the circuit blocks are electrically connected to each other through electrical wiring lines, which are called global wiring lines. The operation speed of the SOC is limited by problems of the signal delay or the increase of power consumption of such global wirings.

If the signal transmission between such circuit blocks is executed using optical signals, it is possible to reduce or prevent problems associated with the signal delay or the increase of power consumption generated from the electrical global wirings and also possible to greatly increase the operation speed of the LSI.

Hence, in order to transmit data using optical signals, an optical transmission device is required to transmit the optical signals emitted from an optical source to a desired place and to input them to a light receiving element, etc. Such related art optical transmission devices include a technology using an optical fiber and a technology using an optical waveguide formed on a substrate.

However, when optical fiber is used as an optical transmission device, connection with optical components, such as a light emitting element and a light receiving element, becomes complicated resulting in problems of enormous fabrication cost and fabrication time, and difficulty in minimizing the size of optical transmission device.

In contrast, simply connecting an optical transmission medium, a light emitting element, and a light receiving element to each other by using an optical waveguide provided on a substrate may be considered. However, input/output configurations suitable for such an optical waveguide have not been developed yet, and the miniaturization and easy fabrication of an optical transmission device to apply to the inside of an integrated circuit, has also not been attained yet.

SUMMARY OF THE INVENTION

Considering the above-described problems, an advantage of an aspect of the present invention is to provide an on-chip optical interconnection circuit, an electro-optical circuit, and an electronic apparatus capable of achieving high speed of signal transmission, easy miniaturization, and easy fabrication.

To achieve the above-described advantage, an aspect of the present invention provides an on-chip optical interconnection circuit, which includes a plurality of circuit blocks provided on one integrated circuit chip and an optical waveguide to optically connect the circuit blocks to each other, the optical waveguide being provided on the integrated circuit chip.

In accordance with an aspect of the present invention, it is possible to perform the data transmission between the circuit blocks provided on one integrated circuit chip using optical signals, which propagate through the optical waveguide, with extremely high speed. Thus, according to an aspect of the present invention, it is possible to greatly enhance the signal transmission speed between a CPU and storage devices, which is a bottleneck of a related art computer system, by constituting the CPU and the storage devices by using, for instance, circuit blocks.

Further, in an on-chip optical interconnection circuit of an aspect of the present invention, it is desirable that the circuit blocks be electrically connected to each other.

In accordance with an aspect of the present invention, between circuit blocks, metal wiring lines can be used to electrically transmit the signals or power not requiring relatively high-speed transmission, and optical waveguides can be used to transmit the signals requiring high-speed transmission with high speed. Thus, according to an aspect of the present invention, it is possible to provide a system capable of processing signals with high speed as a whole while having a simple configuration.

Alternatively, there is provided an on-chip optical interconnection circuit of an aspect of the present invention where the integrated circuit chip preferably includes a micro-tile shaped element which is electrically connected to the circuit block, optically connected to the optical waveguide, and has a light emitting function or a light receiving function.

In accordance with an aspect of the present invention, it is possible to convert electrical input/output signals of the circuit block into optical signals or to convert optical input/output signals into electrical signals using the micro-tile shaped element attached to the peripheral region of the circuit block on the integrated circuit chip. Thus, according to an aspect of the present invention, it is possible to perform the data transmission between circuit blocks with extremely high speed using the micro-tile shaped element and the optical waveguide. Accordingly, according to an aspect of the present invention, it is possible to make a micro-tile shaped element have a very small size (e.g., an area of several hundred or less square micrometers and a thickness of several ten or less micrometers), and make an optical waveguide have a compact shape. As a result, while having an extremely compact structure, it is possible to simply provide a system capable of processing signals with higher speed than the related art.

Further, in an on-chip optical interconnection circuit of an aspect of the present invention, it is desirable that the micro-tile shaped element should be electrically connected to the circuit blocks.

In accordance with an aspect of the present invention, it is possible to convert the electrical signals of the circuit block into the optical signals using the micro-tile shaped element and to transmit them between circuit blocks through the micro-tile shaped element and the optical waveguide.

In addition, according to an aspect of the present invention, it is possible to make a compact configuration by attaching a micro-tile shaped element capable of emitting or receiving light to a desired position of a circuit block. It is also possible to electrically connect a circuit block with the micro-tile shaped element using the metal wiring lines and electrodes in the circuit block and to realize the electrical connection using simple fabricating processes because it is not necessary to form the metal wiring lines and the electrodes outside the circuit block.

Further, in an on-chip optical interconnection circuit of an aspect of the present invention, it is desirable that at least a portion of the optical waveguide should cover the micro-tile shaped elements.

In accordance with an aspect of the present invention, it is possible to make all the light emitted from a micro-tile shaped element capable of emitting light be incident on an optical waveguide, and to make the light propagating along the optical waveguide be effectively incident on the micro-tile shaped element. Thus, according to an aspect of the present invention, it is possible to provide an on-chip optical interconnection circuit having a simple and easily fabricable configuration.

Further, in an on-chip optical interconnection circuit of an aspect of the present invention, it is desirable that at least a portion of the optical waveguide should be provided on top surfaces of the circuit blocks.

In accordance with an aspect of the present invention, when, for instance, each of the micro-tile shaped elements is attached to the corresponding circuit blocks, it is possible to connect the micro-tile shaped elements to each other through one optical waveguide. Thus, according to an aspect of the present invention, it is possible to provide an on-chip optical interconnection circuit having a simpler and more easily fabricable configuration.

Further, in an on-chip optical interconnection circuit of an aspect of the present invention, it is desirable that at least a portion of the optical waveguide be provided on the circuit blocks to cross the circuit blocks.

In accordance with an aspect of the present invention, on the integrated circuit chip, it is possible to shorten the length of path of the optical waveguide because the optical waveguide can be provided regardless of whether the optical waveguide is on the circuit blocks.

Further, in an on-chip optical interconnection circuit of an aspect of the present invention, it is desirable that at least a portion of the optical waveguide be provided to bypass the circuit blocks.

In accordance with an aspect of the present invention, on the integrated circuit chip, when, for instance, a step difference of boundary between a circuit block region and a non-circuit block region is relatively large, it is possible to enhance the efficiency of optical coupling with respect to optical signal transmission by providing the optical waveguide to bypass the circuit block region.

Further, in an on-chip optical interconnection circuit of an aspect of the present invention, it is desirable that the circuit blocks be one of analog circuits, such as a CPU, a memory circuit, a DSP, and a RF amplification circuit, an image sensor, and a biosensor.

In accordance with an aspect of the present invention, for example, it is possible to greatly enhance signal transmission speed between a CPU and a memory device, which is a bottleneck for high-speed information process in a related art computer system. Further, according to an aspect of the present invention, it is possible to provide a more compact and efficient computer system than a related art one-chip computer, because a related art configuration, where a bus is formed between a CPU and a memory circuit using a plurality of metal wiring lines, can be replaced with, for example, one optical waveguide and micro-tile shaped element.

Further, in an on-chip optical interconnection circuit of an aspect of the present invention, it is desirable that the optical waveguide be a transmission line for data signals or clock signals.

In accordance with an aspect of the present invention, it is possible to transmit data signals and clock signals with high speed while having a compact configuration.

Further, in an on-chip optical interconnection circuit of an aspect of the present invention, a plurality of the micro-tile shaped elements are provided on one of the circuit blocks and the optical waveguide is preferably provided at each of the plurality of micro-tile shaped elements provided on one of the circuit blocks.

In accordance with an aspect of the present invention, it is possible to transmit in parallel a plurality of input/output signals to one circuit block at plural sets of micro-tile shaped elements and optical waveguides. Thus, according to an aspect of the present invention, it is possible to further enhance the transmission speed between circuit blocks.

Further, in an on-chip optical interconnection circuit of an aspect of the present invention, a plurality of the integrated circuit chips are mounted on a substrate and the plurality of integrated circuit chips are preferably optically connected to each other at least through micro-tile shaped elements, which have the light emitting function or the light receiving function, and an optical waveguide, which is provided on the substrate.

In accordance with an aspect of the present invention, it is possible to make an electro-optical device, such as a liquid crystal device and a large-scaled computer system including integrated circuit chips, have a compact configuration, and to operate them at high speed.

Further, in an on-chip optical interconnection circuit of an aspect of the present invention, a plurality of the integrated circuit chips are mounted on a substrate, wherein it is desirable that the plurality of integrated circuit chips are mounted close to each other and the plurality of integrated circuit chips are optically or electrically connected to each other.

In accordance with an aspect of the present invention, it is possible to optically or electrically connect the integrated circuit chips to each other by mounting the integrated circuit chips on the substrate and by making the sides of the integrated circuit chips close to each other. Accordingly, according to an aspect of the present invention, it is possible to make the high-speed signal transmission between integrated circuit chips as well as in the respective integrated circuits using optical signals or electrical signals and to make a large-scaled computer system including integrated circuit chips have a further compact configuration and operate with higher speed.

An electro-optical device of an aspect of the present invention comprises the on-chip optical interconnection circuit.

Accordance to an aspect of the present invention, in electro-optical devices, such as a liquid crystal device, an electro-luminescence panel, and a plasma display, a timing control circuit, a driver circuit and the like can be constituted using the on-chip optical interconnection circuit. Hence, according to an aspect of the present invention, it is possible to transmit scanning signals and data signals of the electro-optical device using the on-chip optical interconnection circuit and to control the driving of each pixel at high speed. Thus, it is possible to obtain a planar display device having an enlarged screen, a high quality, and a more compact configuration.

An electronic apparatus of an aspect of the present invention includes the on-chip optical interconnection circuit.

In accordance with an aspect of the present invention, it is possible to process signals at higher speed than a related art and to provide a compact, high efficient, and cheap electronic apparatus by constituting a CPU, a memory circuit, and so on with a module having the on-chip optical interconnection circuit.

Further, according to an aspect of the present invention, it is possible to provide a compact and cheap electronic apparatus capable of displaying a high quality image by, for example, applying the on-chip optical interconnection circuit to a display device.

BRIEF DESCRIPTION OF THE DRAWINGS

FIGS. 2(A) and 2(B) are a side view and a plan view of a circuit element according to an exemplary embodiment of the present invention;

FIGS. 6(A) and 6(B) are a side view and a plan view illustrating a modified example of the circuit element described above;

FIGS. 7(A) and 7(B) are a side view and a plan view illustrating a modified example of the circuit element described above;

FIGS. 8(A) and 8(B) are a side view and a plan view illustrating a modified example of the circuit element described above;

FIGS. 9(A) and 9(B) are a side view and a plan view illustrating a modified example of the circuit element described above;

FIGS. 13(A) and 13(B) are side schematics illustrating another fabricating method according to an exemplary embodiment of the present invention;

DETAILED DESCRIPTION OF PREFERRED EMBODIMENTS

Hereinafter, the on-chip optical interconnection circuit according to an exemplary embodiment of the present invention is described with reference to the accompanying figures.

Figure 1:
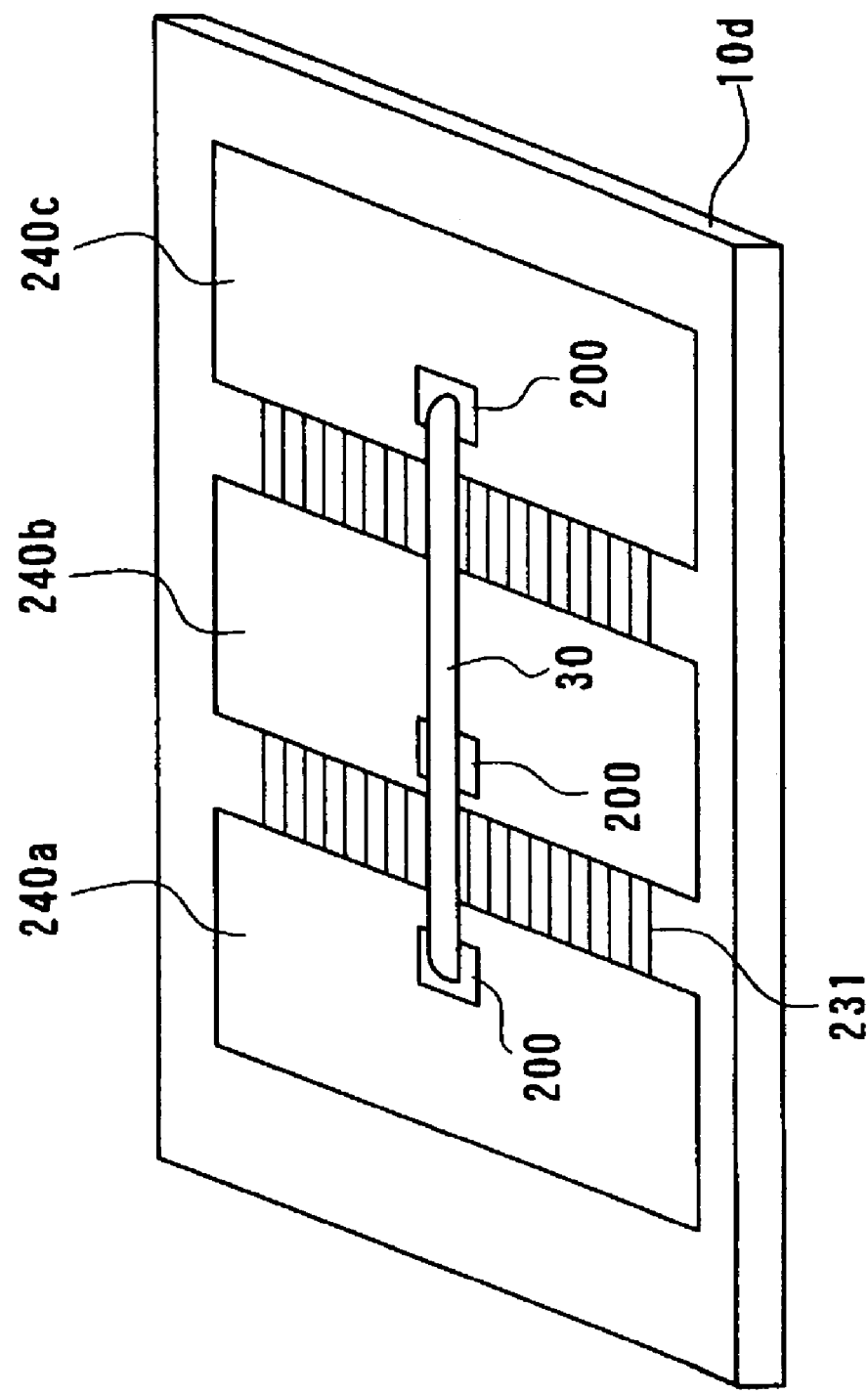
FIG. 1 is a circuit schematic illustrating an integrated circuit chip according to an exemplary embodiment of the present invention.

In the present exemplary embodiment, circuit blocks provided on one integrated circuit chip (IC chip, LSI chip) are optically connected to each other by an optical waveguide or the like. FIG. 1 is a perspective view illustrating an on-chip optical interconnection circuit according to an exemplary embodiment of the present invention.

Three circuit blocks 240*a*, 240*b*, and 240*c* are formed on one integrated circuit chip 10*d*. The integrated circuit chip 10*d* is composed of a semiconductor chip.

The number of circuit blocks formed on the integrated circuit chip 10*d* is not limited to three, but it may be two or more. Other circuits except for the circuit blocks, or electronic elements may be formed on the integrated circuit chip 10*d*.

The circuit blocks 240*a*, 240*b*, and 240*c* constitute a CPU, a memory circuit, an image signal processing circuit, an image signal drive circuit, a communication I/O, various interface circuits, an A/D converter, a D/A converter, and the like. For example, the circuit block 240*a* constitutes the CPU, the circuit block 240*b* constitutes a first memory circuit, and the circuit block 240*c* constitutes a second memory circuit. The circuit blocks 240*a*, 240*b*, and 240*c* may be formed on the integrated circuit chip 10*d* in the form of bipolar integrated circuits, MOS integrated circuits, CMOS integrated circuits, or SOS (Silicon On Sapphire) integrated circuits.

The circuit blocks 240*a*, 240*b*, and 240*c* are electrically connected to each other through metal wiring lines 231.

Further, micro-tile shaped elements 200 are formed at the circuit blocks 240*a*, 240*b*, and 240*c*, respectively. The micro-tile shaped elements 200 are elements, each having a micro-tile shape, which are capable of emitting or receiving light. The micro-tile shaped element capable of emitting light includes, for example, a VCSEL (Vertical Cavity Surface Emitting Laser), a DFB (Distributed Feedback)

laser having an electric field absorptive modulation function, an LED, and the like. The micro-tile shaped element capable of receiving light includes, for example, a photodiode, a phototransistor, or the like. Accordingly, each micro-tile shaped element 200 has, for example, an area of several hundred square micrometers or less and a thickness of several ten or less micrometers, and is adhered to the surface of a substrate 10 with an adhesive. The micro-tile shaped element 200 is electrically connected to the circuit block (any one of circuit blocks 240a, 240b, and 240c).

An optical waveguide 30 is also formed on the integrated circuit chip 10d. The optical waveguide 30 made of a bar-shaped optical waveguide material is formed over the top surface of the integrated circuit chip 10d, the top surfaces of the circuit blocks 240a, 240b, and 240c, and the top surfaces of the metal wiring lines 231. It is desirable that the thickness (height) of the optical waveguide material should have a much larger value than the step differences between the integrated circuit chip 10d and circuit blocks 240a, 240b, and 240c or between the micro-tile shaped elements 200 and the metal wiring lines 231. Such larger thickness is to enhance the efficiency of optical coupling with respect to the optical waveguide 30.

It is possible to apply transparent resin, sol gel glass, and the like to the optical waveguide material. Further, the optical waveguide material forming the optical waveguide 30 is formed to cover each of the micro-tile shaped elements 200. Thus, each of the micro-tile shaped elements 200 is optically connected to the optical waveguide 30. Moreover, an optical absorption film or an optical reflection film may be formed on the surface of the optical waveguide material to reduce or prevent the incidence of disturbance light.

With such a configuration, signals (data) output from the circuit block 240a constituting, for example, a CPU, are converted into optical signals by the micro-tile shaped element 200 on the circuit block 240a. The optical signals emitted from the micro-tile shaped element 200 are incident on the optical waveguide 30 and are propagated in the optical waveguide 30. The optical signals are converted into electrical signals by each of the micro-tile shaped elements 200 on the circuit block 240b and the circuit block 240c and input into each of the circuit block 240b and the circuit block 240c. Thus, according to the present exemplary embodiment, it is possible to perform the data transmission between the circuit blocks 240a, 240b, and 240c on the integrated circuit chip 10d with extremely high speed using the micro-tile shaped elements 200 and the optical waveguide 30.

In the present exemplary embodiment, for example, it may be assumed that the circuit block 240a forms a CPU, the circuit block 240b forms a first memory circuit, and the circuit block 240c forms a second memory circuit. Then, the data transmission between the CPU and the memory circuits can be performed at greatly high speed by optical signals. Accordingly, according to an aspect of the present invention, it is also possible that one data item output from the CPU is striped (written) to two or more memory circuits simultaneously, and thus to perform the data transmission between the CPU and the memory circuits with higher speed.

The optical signals propagating in the optical waveguide 30 may be clock signals. For example, it is assumed that a clock signal (optical signal) is emitted from the micro-tile shaped element 200 on the circuit block 240a, propagated in the optical waveguide 30, and input into the micro-tile shaped elements 200 of the other circuit blocks 240b and 240c. As a result, it is possible to transmit a clock signal having a higher frequency than that of a related art through the optical waveguide 30 and to operate each of the circuit blocks 240a, 240b, and 240c with high speed.

Further, in the present exemplary embodiment, the circuit blocks 240a, 240b, and 240c are electrically connected to each other through the metal wiring lines 231. Accordingly, it is possible to transmit signals and power not requiring relatively high-speed transmission through the metal wiring lines 231.

In addition, in the present exemplary embodiment, it is possible to simply fabricate a very compact optical signal transmission unit by executing the conversion between optical signals and electrical signals at the micro-tile shaped elements 200 attached to each of the circuit blocks 240a, 240b, and 240c.

Further, in the present exemplary embodiment, the optical waveguide 30 is provided on the circuit blocks 240a, 240b, and 240c to cross the circuit block 240b. Accordingly, it is possible to shorten the length of path of the optical waveguide 30. The optical waveguide 30, on the integrated circuit chip 10d, can be formed regardless of whether the optical guide 30 is on the top surfaces of the circuit blocks 240a, 240b, and 240c.

Furthermore, the optical waveguide 30 may be provided on the surface of the integrated circuit chip 10d to bypass the circuit blocks 240a, 240b, and 240c. With this configuration, on the surface of the integrated circuit chip 10d, it is possible to enhance the efficiency of optical coupling in the optical signal transmission process because the optical waveguide 30 can be provided on an even plane even when the step difference between the surfaces of the circuit blocks 240a, 240b, and 240c and the surfaces of other regions is big.

The optical waveguide 30 is not limited to a linear shape as shown in FIG. 1. It may be formed in a curved shape, a branch shape, and a loop shape.

In the exemplary embodiment illustrated in FIG. 1, the micro-tile shaped elements 200 are attached respectively to the circuit blocks 240a, 240b, and 240c and are connected to the one optical waveguide 30. However, a plurality of micro-tile shaped elements 200 may be attached to each of the circuit blocks 240a, 240b, and 240c. Furthermore, the micro-tile shaped elements 200 may be connected to each other by a plurality of optical waveguides 30. As a result, by a plurality of sets of the micro-tile shaped elements 200 and the optical waveguides 30, it is possible to transmit optical signals in parallel and to perform data transmission with higher speed.

In the exemplary embodiment illustrated in FIG. 1, all of the circuit blocks 240a, 240b, and 240c are connected to the optical waveguide 30. However, only some circuit blocks (e.g., the circuit block 240a and the circuit block 240b) may be connected to the optical waveguide 30.

Moreover, a plurality of the integrated circuit chips 10d, shown in FIG. 1, may be mounted on a substrate. In such a case, it is desirable that the sides of the integrated circuit chips 10d should be arranged to be close to each other. It is desirable that each of the plurality of integrated circuit chips 10d be mounted by a flip chip technique. As a result, it is possible to compactly mount the integrated circuit chips 10d on the substrate. Further, in such a configuration, it is possible to easily connect the plurality of integrated circuit chips 10d to each other using the micro-tile shaped elements 200 and the optical waveguide 30. Thus, it is possible to achieve a compact and highly efficient large-scaled computer system including the plurality of integrated circuit chips 10d.

Optical Interconnection Circuit

Next, an optical interconnection circuit included in the on-chip interconnection circuit of the above-described exemplary embodiment is described in detail. Hereinafter, although a case where an optical interconnection circuit including micro-tile shaped elements and an optical waveguide is provided on a substrate 10 is described, in the same manner, a relevant optical interconnection circuit may be provided on the integrated circuit chip 10d shown in FIG. 1.

FIG. 2 is a schematic illustrating an optical interconnection circuit according to the present exemplary embodiment, and FIGS. 2(a) and 2(b) are a schematic side view and a schematic plan view thereof, respectively. The optical interconnection circuit according to the present exemplary embodiment includes a first micro-tile shaped element 21 and a second micro-tile shaped element 22, which are adhered to the surface of the substrate 10, and an optical waveguide 30 made of an optical waveguide material, which is formed on the surface of the substrate 10 to connect the first micro-tile shaped element 21 to the second micro-tile shaped element 22. Here, the same elements as the elements shown in FIG. 1 are indicated by the same reference numerals. In addition, the first micro-tile shaped element 21 and the second micro-tile shaped element 22 are equal to the micro-tile shaped element 200 as described in the aforementioned exemplary embodiment. Transparent resin or sol gel glass can be used as the optical waveguide material forming the optical waveguide 30. It is possible to use any one of glass epoxy, ceramic, plastic, polyimide, silicon, glass, and the like as the substrate 10.

The first micro-tile shaped element 21 includes a light emitting part 21a capable of emitting light. The second micro-tile shaped element 22 includes a light receiving part 22b capable of receiving light. At least the light emitting part 21a of the first micro-tile shaped element 21 and the light receiving part 22b of the second micro-tile shaped element 22 are covered with the optical waveguide material which constitutes the optical waveguide 30.

With such a configuration, the light emitted from the light emitting part 21a of the first micro-tile shaped element 21 propagates along the optical waveguide 30 and reaches the light receiving part 22b of the second micro-tile shaped element 22. When an optical signal is emitted from the light emitting part 21a by controlling the light emitting operation of the light emitting part 21a, the optical signal propagates along the optical waveguide 30, and the optical signal can be detected by the light receiving part 22b.

Further, the optical signal emitted from the first micro-tile shaped element 21 propagates along the optical waveguide 30 and is incident on the second micro-tile shaped element 22 and passes through the second micro-tile shaped element 22. As a result, it is possible to almost simultaneously transmit optical signals from one micro-tile shaped element 21 to a plurality of the second micro-tile shaped elements 22. Herein, when the thickness of the second micro-tile shaped element 22 is set to 20 μm or less, the step difference between the substrate and the second micro-shaped element 22 becomes sufficiently small. Thus, as shown in FIG. 2, the optical waveguide 30 can be formed consecutively regardless of the step difference. Even when the optical waveguide 30 is formed consecutively at the step portion, light transmission loss, such as scattering, can be neglected because the step difference is sufficiently small. For such a reason, a specific configuration or an optical element to alleviate the step difference is unnecessary. Thus, it is possible to simply and cheaply fabricate it. Further, the thickness of the optical waveguide material forming the optical waveguide 30 can be several ten or less micrometers.

The first micro-tile shaped element 21 includes, for example, an LED, a VCSEL (vertical cavity surface emitting laser), and a DFB laser having an electric field absorbing modulator. Although the LED has the simplest structure and is easy to fabricate as a light emitting device, the modulation speed of the optical signals is as slow as several hundred Mbps. In contrast, because the VCSEL has a high modulation speed of 10 Gbps or more, a small threshold current, and high light-emitting efficiency, it is possible to drive it with low power consumption. In the DFB laser, although modulation speed is 1 Gbps, inferior to that of the VCSEL, it is possible to transmit optical signals with higher efficiency than the VCSEL since laser beam is emitted from the end of the micro-tile shape in a direction parallel to the plane of the substrate 10, i.e., in a direction along the optical waveguide 30.

The second micro-tile shaped element 22 includes, for example, a photodiode or a phototransistor. Herein, as the photodiode, a PIN type photodiode, an APD (Avalanche Photo Diode), an MSM type photo diode can be used depending on use. The APD has high photosensitivity and response frequency. The MSM type photodiode has a simple structure and is easily integrated with an amplifying transistor.

Further, a third micro-tile shaped element (not shown), which is composed of a light receiving element, may be formed to overlap the first micro-tile shaped element 21. When being formed in such a manner, the quantity of light emitted from the first micro-tile shaped element 21 is monitored by the third micro-tile shaped element, and then the monitored value is fed back to the first micro-tile shaped element 21. As a result, APC function is attained, so that stable optical data transmission can be achieved. Alternatively, the APC function may be built in the first micro-tile shaped element 21 itself. Further, it is desirable that the second micro-tile shaped element 22 should have an amplifying circuit to amplify the detected signals. As a result, it is possible to further enhance the efficiency of the apparatus.

Hence, the first micro-tile shaped element 21 and the second micro-tile shaped element 22 are electrically connected to electronic circuits (not shown), such as an integrated circuit, an EL display circuit, a plasma display, a liquid crystal display circuit, and the like, which are provided on the substrate 10. As a result, the computer system including integrated circuits can be compact and have higher operation speed than the related art. Further, by an optical interconnection circuit according to the present exemplary embodiment, it is possible to transmit the scanning signals of a planar display or the like provided on the substrate 10 at high speed and to achieve the planar display device having the enlarged screen and high quality images.

In FIG. 2, although each of the first micro-tile shaped element 21 and the second micro-tile shaped element 22 is coupled to one optical waveguide 30, a plurality of the second micro-tile shaped elements 22 may be connected thereto. In such a case, it is possible for optical signals emitted from one first micro-tile shaped element 21 (light emitting element) to be propagated along the optical waveguide 30 and to be simultaneously detected by the plurality of second micro-tile shaped elements 22. This is equal to the bus lines having a set more.

In addition, a plurality of the first micro-tile shaped elements 21 and a plurality of the second micro-tile shaped elements 22 may be formed. In such a case, the wavelength of light emitted from each of the first micro-tile shaped elements 21 may be different. It is desirable that each of the second micro-tile shaped elements 22 should be light receiving devices capable of selecting the wavelength corresponding to that of the light emitted from at least one first micro-tile shaped element 21. As a result, it is possible for optical signals emitted from the first micro-tile shaped elements 21 to propagate the optical waveguide 30 simultaneously and to be detected by the respective second micro-tile shaped elements 22. Thus, it is possible to simply and easily constitute a bus capable of transmitting and receiving optical signals in parallel.

In addition, while being formed in a liner shape in FIG. 2, the optical waveguide 30 may be formed in a curved shape or in a branch shape. Further, the optical waveguide 30 may be formed in a loop shape. It is also possible that the optical waveguide 30 should be formed in a sheet shape to cover the plurality of tile-shaped elements. To be sure, it is also possible for plural sets of the first micro-tile shaped element 21, the second micro-tile shaped element 22, and the optical waveguide 30 to be formed on the top surface of one substrate 10. Moreover, it is also possible for the first micro-tile shaped element 21, the second micro-tile shaped element 22, and the optical waveguide 30 to be formed on both of the front and back surfaces of the substrate 10.

Figure 3:
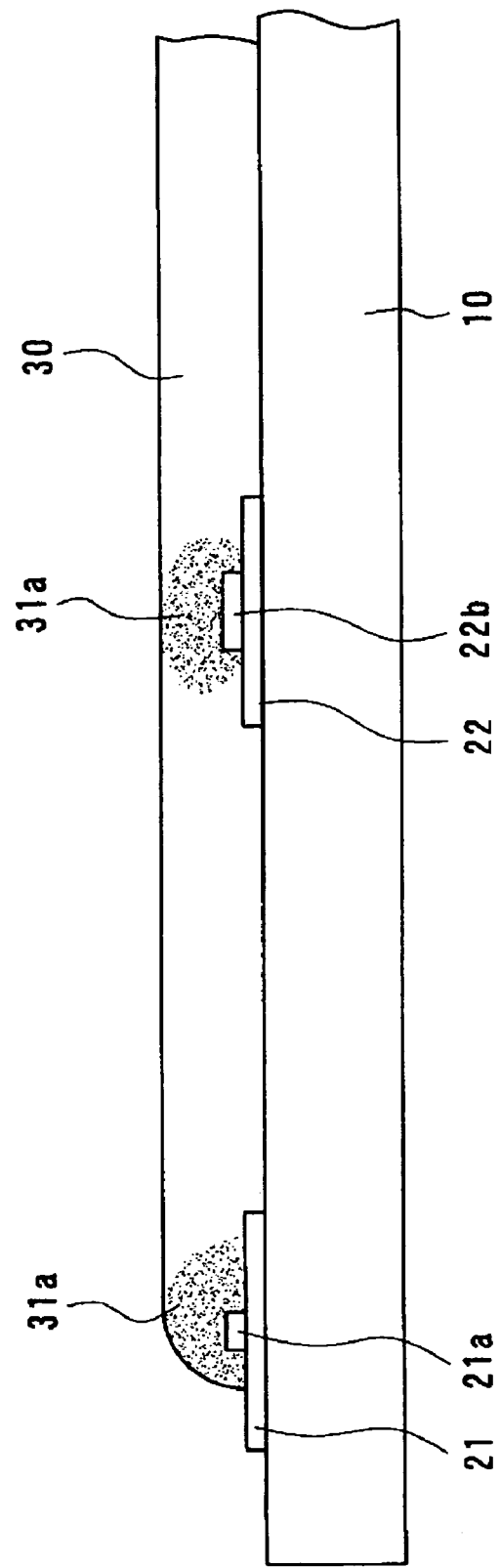
FIG. 3 is a side view illustrating a modified example of the circuit element described above.

Then, a modified example of the optical interconnection circuit according to the present exemplary embodiment is described with reference to FIGS. 3 to 6. Unlike the exemplary embodiment of FIG. 2, the present exemplary embodiment has a light scattering frame to scatter light at the optical waveguide 30 positioned in the neighborhood of the first micro-tile shaped element 21 and the second micro-tile shaped element 22. FIG. 3 is a schematic side view illustrating a modified example of the optical interconnection circuit according to the present exemplary embodiment.

In the optical interconnection circuit, light scattering particles forming a light scattering frame 31 a are dispersed in the optical waveguide material forming the optical waveguide 30 in the neighborhood of the first micro-tile shaped element 21 and the second micro-tile shaped element 22. For example, silica particle, glass particle, metal particle, and the like may be used as the light scattering particle. The optical waveguide 30 having the light scattering frame 31 a is formed in a liquid droplet discharging manner to discharge a liquid droplet from, for example, a dispenser, an inkjet nozzle, and the like. Specifically, the optical waveguide 30 having such light scattering frame 31a is formed by discharging a liquid optical waveguide material (such as resin) from one inkjet nozzle or the like to a desired portion while by discharging a liquid optical waveguide material containing light scattering particles from another inkjet nozzle to a desired portion.

Further, except for resin, sol gel glass can be used as a material forming the optical waveguide 30. A method of fabricating the sol gel glass includes the steps of: adding an acid to metal alkoxide to form a hydrolyzed solution; applying the hydrolyzed solution to a desired portion; and applying energy, such as heat, for vitrification.

Figure 4:
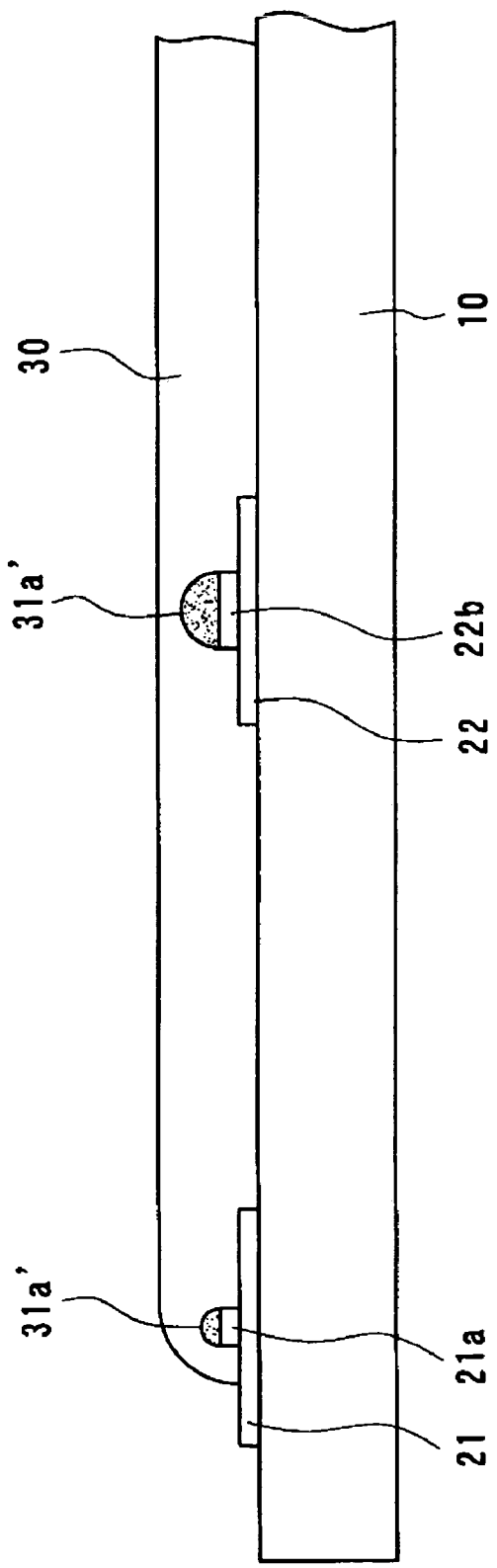
FIG. 4 is a side view illustrating a modified example of the circuit element described above.

FIG. 4 is a schematic side view illustrating another modified example of the optical interconnection circuit according to the present exemplary embodiment. A light scattering frame 31a' of the optical interconnection circuit is a dome-shaped light scattering frame made of resin or glass, in which light scattering particles are dispersed. An optical waveguide 30 is formed to cover such light scattering frame 31a' (the dome-shaped light scattering frame). As compared with the light scattering frame 31a shown in FIG. 3, it is possible to easily adjust the optical coupling efficiency between the optical waveguide 30 and a first micro-tile shaped element 21 or a second micro-tile shaped element 22 because it is easy to control the size and shape of the light scattering frame 31a'.

Next, a method of fabricating the light scattering frame 31a' is described. First, an acid is added to metal alkoxide, such as liquid resin or silica ethyl containing light scattering particles, using an inkjet or a dispenser, and the liquid mixture is hydrolyzed. Then, the hydrolyzed solution is applied to a desired portion of a substrate 10 in a dome shape. Then, energy, such as heat, is supplied to the applied portion to make the solution hardened or glassed. As a result, the light scattering frame 31a' having a dome shape is formed on the first micro-tile shaped element 21 or the second micro-tile shaped element 22. Next, a linear-shaped optical waveguide 30 is formed using transparent resin or sol gel glass to cover the light scattering frame 31a' having a dome shape.

Figure 5:
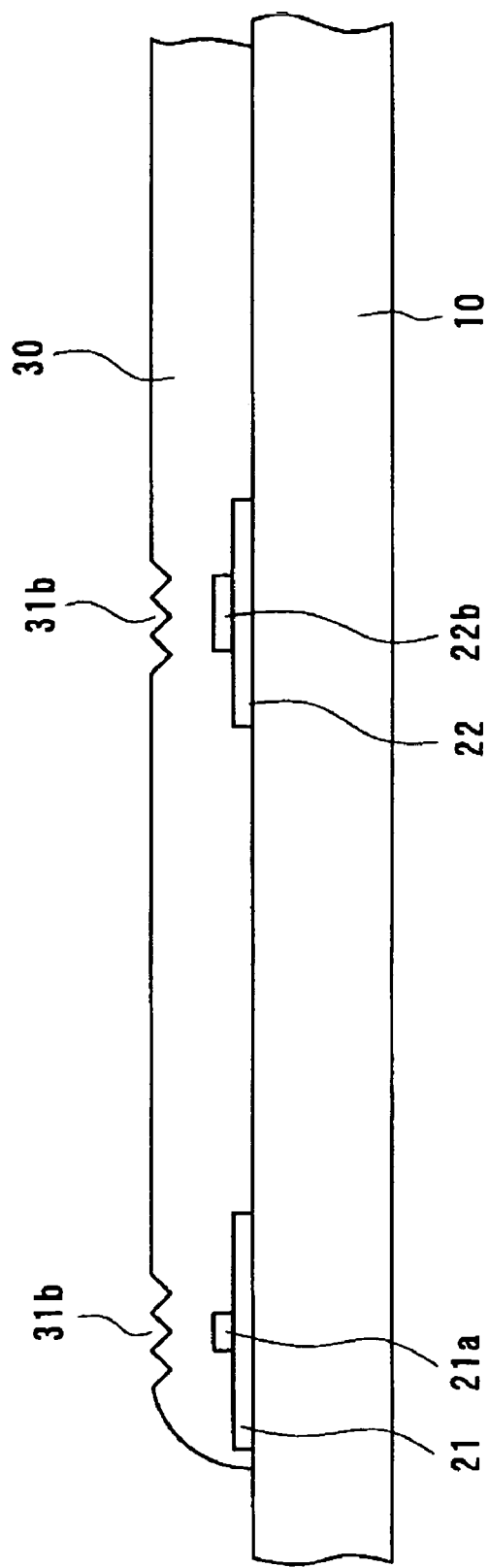
FIG. 5 is a side view illustrating a modified example of the circuit element described above.

FIG. 5 is a schematic side view illustrating another modified example of the optical interconnection circuit according to the present exemplary embodiment. A light scattering frame 31b of the optical interconnection circuit has a configuration in which a surface of an optical waveguide material forming an optical waveguide 30 has concave and convex portions. The light scattering frame 31b is also formed in the neighborhood of a first micro-tile shaped element 21 and a second tile-shaped element 22. Herein, the concave and convex portions constituting the light scattering frame 31b are formed by an embossing process or a stamper transfer.

FIG. 6 illustrates another modified example of the optical interconnection circuit according to the present exemplary embodiment. FIG. 6(a) is a schematic side view thereof, and FIG. 6(b) is a schematic plan view thereof. A light scattering frame 31c of the optical interconnection circuit has a configuration in which the line width and height of an optical waveguide material forming an optical waveguide 30 vary. That is, in the optical waveguide 30, the line width and height of the optical waveguide material are decreased in the neighborhood of a light receiving part 22b of the second micro-tile shaped 22.

Hereinafter, a method of fabricating the optical waveguide 30 having the light scattering frame 31c is described. First, a first micro-tile shaped element 21 and a second micro-tile shaped 22 are adhered to predetermined portions of the surface of the substrate 10. Then, liquid repellent treatment is performed on the entire surface of the substrate 10 and the entire surfaces of the first micro-tile shaped element 21 and the second micro-tile shaped 22. Next, on the surfaces subjected to the liquid repellent treatment, a lyophilic treatment is performed in a portion in which the optical waveguide 30 is formed. Herein, the portion subjected to the lyophilic treatment has a linear shape having a partly narrowed line width in the neighborhood of the light receiving part 22b of the second micro-tile shaped element 22. The lyophilic treatment is executed by the radiation of UV light.

Next, a liquid optical waveguide material is dropped from an inkjet nozzle or the like to the inside of the portion subjected to the lyophilic treatment. Accordingly, the dropped optical waveguide material permeates the portion subjected to the lyophilic treatment and is repelled from the portion subjected to the liquid repellent treatment, and surface tension acts thereto. As a result, the optical waveguide material becomes a linear shape having a narrowed width portion in the neighborhood of the light receiving part 22b as shown in FIG. 6.

As described above, in the optical waveguide 30, by providing the light scattering frames 31a, 31b, and 31c in the neighborhood of the first micro-tile shaped element 21, it is possible that the optical signals emitted from the first micro-tile shaped element 21 are scattered from the light scattering frames 31a, 31b, and 31c and effectively propagate along the whole optical waveguide. Further, by providing the light scattering frames 31a, 31b, and 31c in the neighborhood of the second micro-tile shaped element 22, it is possible that optical signals, which propagated along the optical waveguide 30, are scattered in the neighborhood of the second micro-tile shaped element 22 and are effectively incident on the second micro-tile shaped element 22.

Next, still another modified example of the optical interconnection circuit according to the present exemplary embodiment is described with reference to FIGS. 7 to 9. Unlike the exemplary embodiment described above, the present exemplary embodiment has light reflecting frames to reflect light at the neighborhood of a first micro-tile shaped element 21 and a second micro-tile shaped element 22 in the optical waveguide 30 or at the end of the optical waveguide 30. FIG. 7 illustrates a modified example of the optical interconnection circuit according to the present exemplary embodiment. FIG. 7(a) is a schematic side view thereof, and FIG. 7(b) is a schematic plan view thereof.

For example, the light reflecting frames 32a and 32b are formed by forming a metal film over the surface of an optical waveguide material constituting the optical waveguide 30. In addition, the light reflecting frames 32a and 32b may be formed by applying paints containing metal fine particles over the surface of the optical waveguide material constituting the optical waveguide 30. Fine particles of silver, aluminum, magnesium, copper, nickel, titanium, chrome, and zinc may be applied as the metal fine particles. Forming the metal film and applying paints containing the metal fine particles constituting the light reflecting frames 32a and 32b may be carried out by discharging paints from an inkjet nozzle. It is also possible that the light reflecting frame 32a or the light reflecting frame 32b may be formed over the whole optical waveguide 30.

With such a configuration, the optical signals emitted from the first micro-tile shaped element 21 are reflected by the light reflecting fra optical waveguide 30, and a part of the optical signals is reflected again by the light reflecting frame 32b to the direction of the second micro-tile shaped element 22. Thus, according to the present exemplary embodiment, it is possible to effectively transmit optical signals.

FIG. 8 illustrates still another modified example of the optical interconnection circuit according to the present exemplary embodiment. FIG. 8(a) is a schematic side view thereof, and FIG. 8(b) is a schematic plan view thereof. A light reflecting frame 32c of the optical interconnection circuit has a configuration in which a reflecting plate with a reflecting surface is attached to an end of the optical waveguide 30. Herein, the reflecting surface of the reflecting frame 32c is provided to incline, e.g., 45° with respect to the surface of the substrate 10.

Further, two optical waveguide 30a and 30b, which are parallel to each other, are provided in the optical interconnection circuit. Moreover, the light reflecting frame 32c includes a reflecting plate, which is provided at one end of two optical waveguides 30a and 30b, and is commonly used for the two optical waveguides 30a and 30b. Thus, the optical signals emitted from each of two first micro-tile shaped elements 21 are reflected by the light reflecting frame 32c in a direction along the optical waveguides 30a and 30b, respectively. As a result, according to the present exemplary embodiment, it is possible to effectively transmit optical signals and to effectively fabricate an optical interconnection circuit.

Moreover, in FIG. 8, although the common reflecting frame 32c is provided for the two optical waveguides 30a and 30b, the common light reflecting frame 32c may be provided for three or more optical waveguides.

FIG. 9 illustrates still another modified example of the optical interconnection circuit according to the present exemplary embodiment. FIG. 9(a) is a schematic side view thereof, and FIG. 9(b) is a schematic plan view thereof. Light reflecting frames 32d and 32e of the present optical interconnection circuit are plate-shaped optical components (grating components) in which grating is performed. On the optical waveguide 30, the light reflecting frame 32d is provided to cover the first micro-tile shaped element 21, and the light reflecting frame 32e is provided to cover the second micro-tile shaped element 22.

Herein, when the distance between an optical waveguide 30a and an optical waveguide 30b is relatively large, as shown in FIG. 9, light reflecting frames 32e are individually attached to the optical waveguides 30a and 30b. When the optical waveguide 30a and the optical waveguide 30b are provided to be close and almost parallel to each other, as shown in FIG. 9, a light reflecting frame 32d may be attached in common to the optical waveguide 30a and the optical waveguide 30b.

The light scattering frames and light reflecting frames illustrated in FIGS. 3 to 9 are more effective when used in combination thereof.

Fabricating Method

Next, an exemplary method of fabricating the optical waveguide 30 of the optical interconnection circuit according to the present exemplary embodiment is described with reference to FIGS. 10 to 13. FIG. 10 is a schematic side view illustrating a method of fabricating the optical waveguide 30.

Figure 10A:
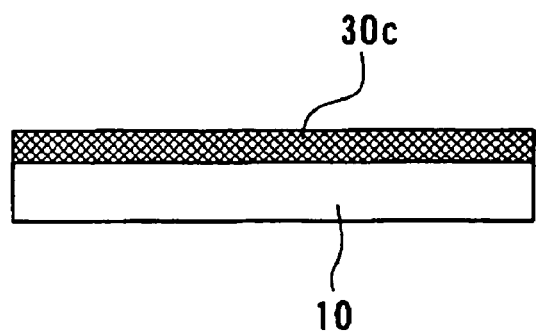
FIGS. 10(A) and 10(B) are side schematics illustrating a fabricating method according to an exemplary embodiment of the present invention.

First, the first micro-tile shaped element and the second micro-tile shaped element are attached to the top surface of the substrate 10. Then, a process to fabricate the optical waveguide 30 is performed. As shown in FIG. 10(a), photo-curable resin 30c in a liquid state is coated over the entire surface of the substrate 10 and the surfaces of the first micro-tile shaped element and the second micro-tile shaped element (not shown). Such a coating may be performed by a spin coating method, a roll coating method, a spray coating method, and the like.

Figure 10B:
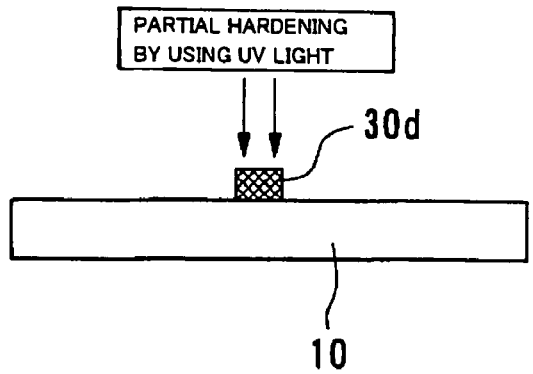

Next, UV light is radiated to the liquid photo-curable resin 30c with a desired pattern mask used. As a result, only the desired region of the liquid photo-curable resin 30c is hardened to be patterned. Hence, as shown in FIG. 10(b), the optical waveguide 30d made of an optical waveguide material is formed by removing resin not hardened by cleansing.

Figure 11A:
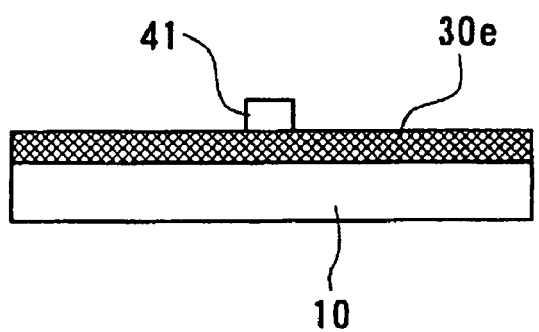
FIGS. 11(A) and 11(B) are side schematics illustrating another fabricating method according to an exemplary embodiment of the present invention.
Figure 11B:
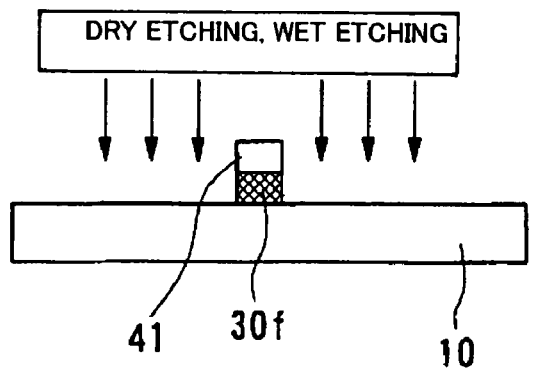

FIG. 11 shows side schematics illustrating another example of an exemplary method of fabricating the optical waveguide 30. First, the first micro-tile shaped element and the second micro-tile shaped element are attached to the top surface of the substrate 10. Then, a process to fabricate the optical waveguide 30 is performed. Then, as shown in FIG. 11(a), resin 30e is coated over the entire top surface of the substrate 10 and the top surfaces of the first micro-tile shaped element and the second micro-tile shaped element (not shown). Such a coating may be performed by a spin coating method, a roll coating method, a spray coating method, and the like. Then, a resist mask 41 is formed at the desired region on the resin 30e. The region on which the resist mask 41 is formed is equal to a region where the optical waveguide 30 is formed.

Next, as shown in FIG. 11(*b*), dry etching or wet etching is performed on the entire substrate 10 with the resist mask 41 put thereon, and resin 30*e* except for a portion under the resist mask 41 is removed. The optical waveguide 30*f* made of an optical waveguide material is formed by removing the resist mask 41 through photolithography patterning in this way.

Figure 12A:
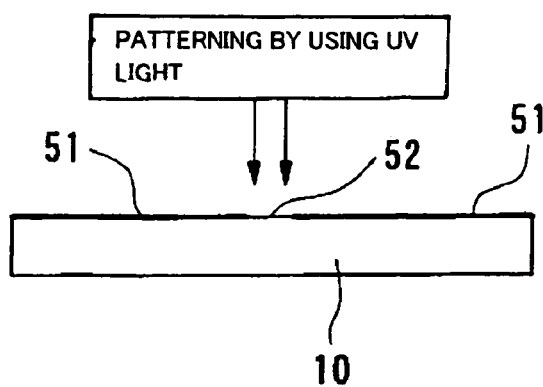
FIGS. 12(A) and 12(B) are side schematics illustrating another fabricating method according to an exemplary embodiment of the present invention.
Figure 12B:
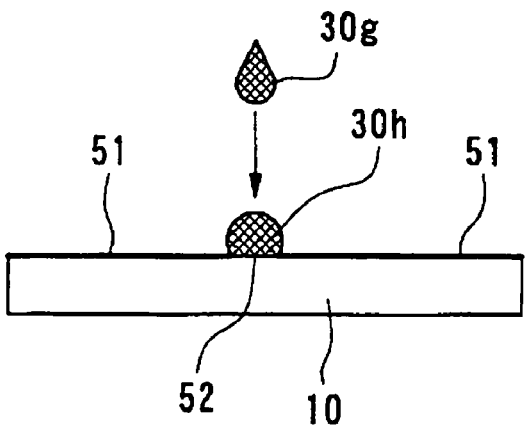

FIG. 12 shows side schematics illustrating another example of an exemplary method of fabricating the optical waveguide 30. First, the first micro-tile shaped element and the second micro-tile shaped element are attached to the top surface of the substrate 10. Then, the process to fabricate the optical waveguide 30 is performed. Then, the liquid repellent treatment is performed on the entire surface of the substrate 10 and the entire surfaces of the first micro-tile shaped element and the second micro-tile shaped element to provide a liquid repellent surface 51.

Next, as shown in FIG. 12(*a*), UV light is radiated to the desired region of the liquid repellent surface 51, such that the desired region of the liquid repellent surface 51 can be changed into a lyophilic surface 52. Then, as shown in FIG. 12(*b*), a liquid optical waveguide material 30*g* is dropped from an inkjet nozzle, a dispenser, or the like to the lyophilic region 52. Transparent resin or sol gel solution may be used as the optical waveguide material 30*g*. Then, the optical waveguide 30*h* made of the optical waveguide material is formed by hardening the optical waveguide material 30*g* dropped on the substrate 10.

When the optical waveguide material 30*g* is made of sol gel glass, an acid is added to metal alkoxide, and then hydrolyzed solution is dropped from the inkjet nozzle or the dispenser to the lyophilic surface 52. Then, energy, such as heat, is applied to the dropped solution for vitrification, thereby forming an optical waveguide 30*h*.

FIG. 13 shows side schematics illustrating another example of an exemplary method of fabricating the optical waveguide 30. First, the first micro-tile shaped element and the second micro-tile shaped element are attached to the top surface of the substrate 10. Then, a process to fabricate the optical waveguide 30 is performed. Hence, as shown in FIG. 13(*a*), liquid resin 30*i* is applied over the top surface of the substrate 10 and the top surfaces of the first micro-tile shaped element and the second micro-tile shaped element to cover a region in which the optical waveguide 30 is formed.

Next, a stamper 51 having a pattern shape 52 of the optical waveguide 30 is pressed to a surface of the substrate 10 from the upper part of the substrate 10. Then, as shown in FIG. 13(*b*), the stamper 51 is raised from the substrate 10. As a result, by a pattern transfer method using the stamper 51, an optical waveguide 30*j* made of an optical waveguide material is formed in the desired pattern on the substrate 10.

Other than the exemplary methods illustrated in FIGS. 10 to 13, an exemplary method of fabricating the optical waveguide 30 described below may be used. For example, an optical waveguide material forming the optical waveguide 30 may be provided by a printing method, such as a screen printing, or an offset printing. Alternatively, the optical waveguide material forming the optical waveguide 30 may be provided by a slit coating method in which liquid resin is discharged from gaps of a slit shape. As the slit coating method, a desired medium, such as resin, may be applied to the substrate 10 by using a capillary phenomenon.

Exemplary Method of Fabricating Micro-tile Shaped Element

Next, an exemplary method of fabricating micro-tile shaped elements constituting the first micro-tile shaped element 21 and the second micro-tile shaped element 22 are described with reference to FIGS. 14 to 23. The micro-tile shaped element of the present exemplary embodiment is fabricated by an epitaxial lift-off technique as its basis. In the present fabricating method, although a case where a compound semiconductor device (a compound semiconductor element) as the micro-tile shaped element is attached to silicon/LSI chip forming a substrate is described, an aspect of the present invention can be applied regardless of the kind of a semiconductor device or the kind of a LSI chip. In addition, although a "semiconductor substrate" in the present exemplary embodiment represents an advantage made of a semiconductor material, the "semiconductor substrate" is not limited to a plate-shaped semiconductor, but may be of any shape, so far as it is made of a semiconductor material.

Figure 14:
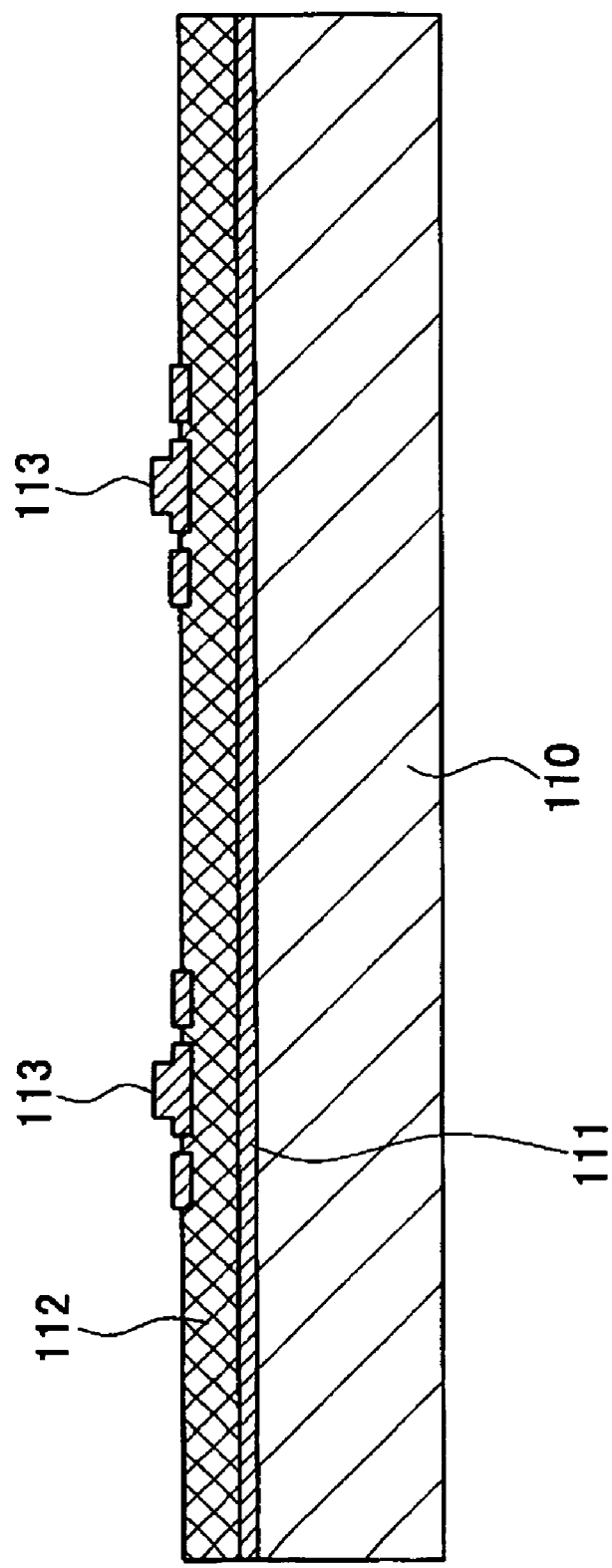
FIG. 14 is a schematic sectional view illustrating a first step of an exemplary method of fabricating a micro-tile shaped element.

FIG. 14 is a schematic sectional view illustrating a first step of an exemplary method of fabricating the micro-tile shaped element. In FIG. 14, a substrate 110 is a semiconductor substrate, e.g., a GaAs compound semiconductor substrate. A sacrifice layer 111 is provided in the lowest layer of the substrate 110. The sacrifice layer 111 is made of AlAs, and its thickness is several hundred nanometers.

For example, a function layer 112 is provided on the upper side of the sacrifice layer 111. The thickness of the function layer 112 is, for example, in the range of 1 to 10 (20) micrometers. Then, a semiconductor device (a semiconductor element) 113 is formed in the function layer 112. The semiconductor device 113 includes a light emitting diode (LED), a vertical cavity surface emitting laser (VCSEL), a photodiode (PD), a DFB laser, and the like. Such a semiconductor device 113 is formed by stacking multi epitaxial layers on the substrate 110. Further, electrodes are formed in the semiconductor device 113 for an operation test.

Figure 15:
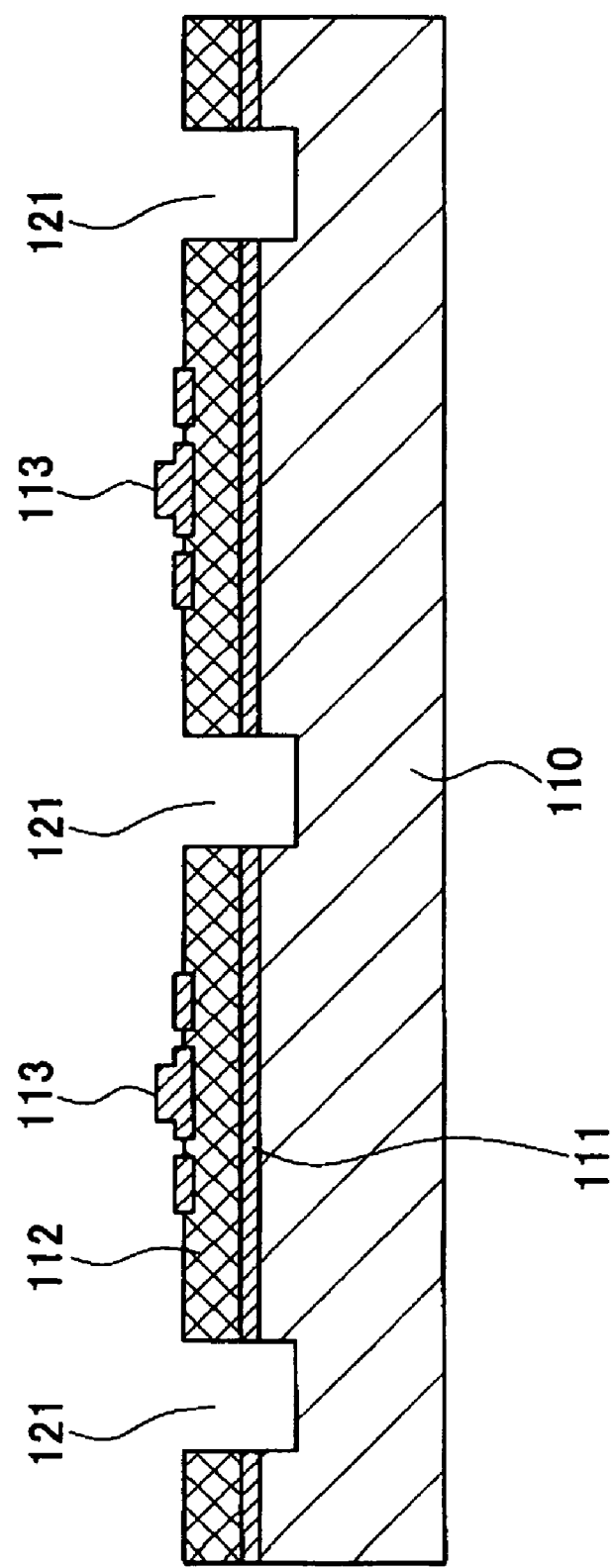
FIG. 15 is a schematic sectional view illustrating a second step of the exemplary fabricating method described above.

FIG. 15 is a schematic sectional view illustrating a second step of the exemplary method of fabricating the micro-tile shaped element. In the present step, partitioning grooves 121 are formed to partition each semiconductor device 113. The partitioning grooves 121 have the depth at least reachable to the sacrifice layer 111. For example, both the width and depth of the partitioning grooves are in the range of several ten to several hundred micrometers. Further, the partitioning grooves 121 are formed to be connected to each other such that the selective etching solution, which is described later, can flow in the partitioning grooves 121. Moreover, it is desirable that the partitioning grooves 121 should be formed in a lattice shape.

Further, the distance between the partitioning grooves 121 is set to be in the range of several ten to several hundred micrometers, so that each of the semiconductor device 113 can be defined by the partitioning grooves 121 to have an area of several ten to several hundred square micrometers. As a method of fabricating the partitioning grooves 121, a photolithography method and a wet etching or a dry etching method are used. In addition, the partitioning grooves 121 may be formed using U-shaped groove dicing within a range where crack is not generated in the substrate.

Figure 16:
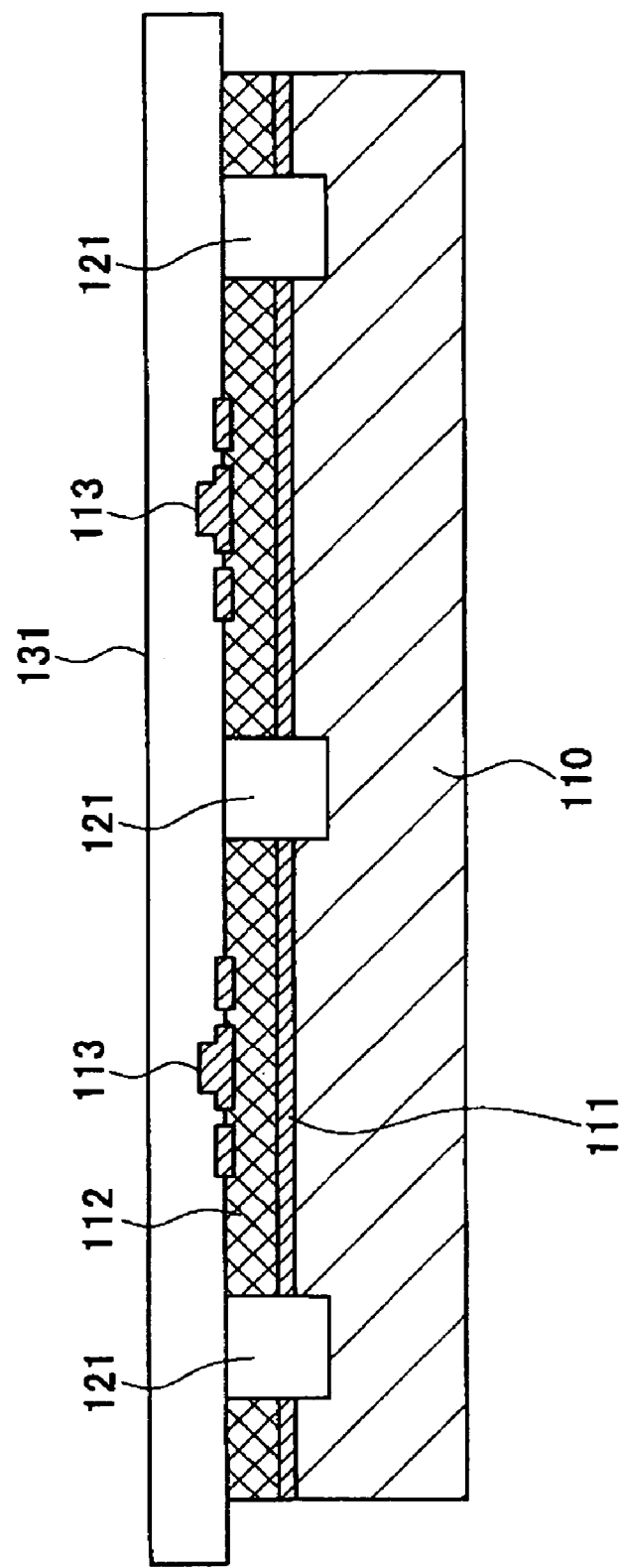
FIG. 16 is a schematic sectional view illustrating a third step of the exemplary fabricating method described above.

FIG. 16 is a schematic sectional view illustrating a third step of the exemplary method of fabricating the micro-tile shaped element. In the present step, an intermediate transfer film 131 is attached to the surface of the substrate 110

(semiconductor device 113 side). The intermediate transfer film 131 is a band-shaped film with its surface coated with an adhesive.

Figure 17:
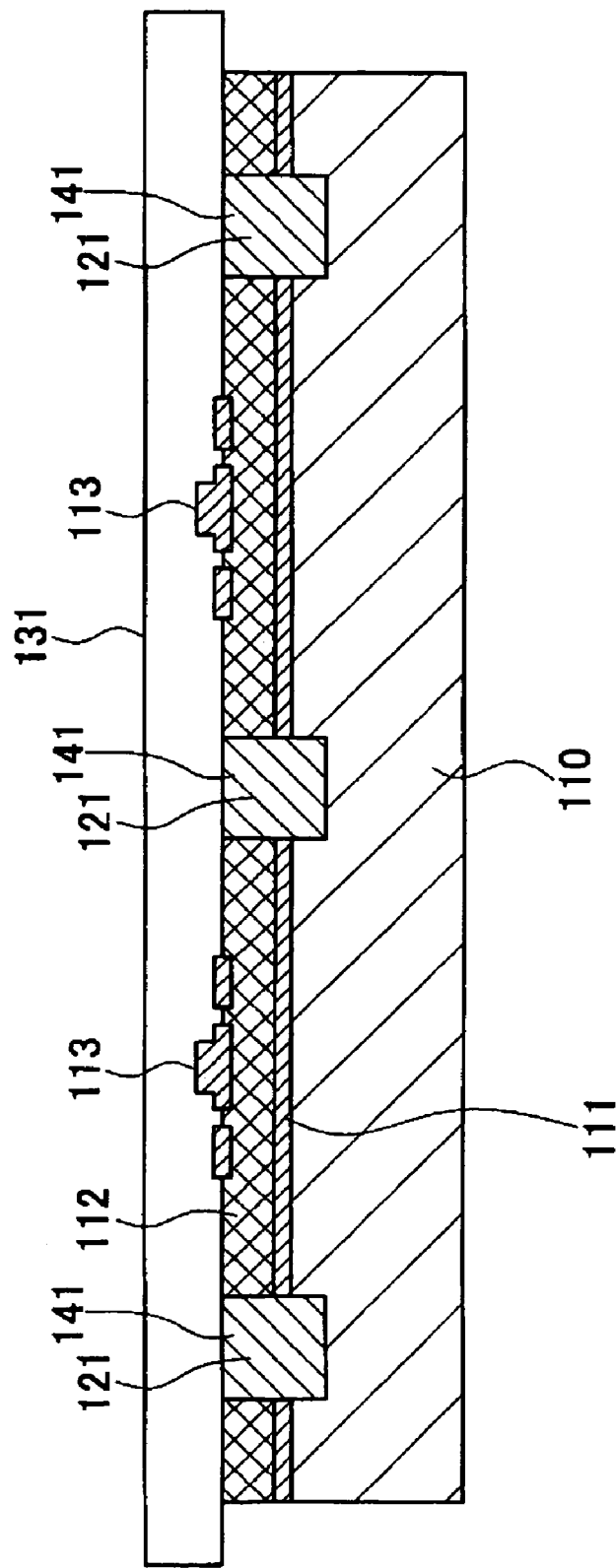
FIG. 17 is a schematic sectional view illustrating a fourth step of the exemplary fabricating method described above.

FIG. 17 is a schematic sectional view illustrating a fourth step of the exemplary method of fabricating the micro-tile shaped element. In the present step, the selective etching solution 141 is injected into the partitioning grooves 121. In the present step, in order to selectively etch only the sacrifice layer 111, a hydrochloric acid of low density, which has high selectivity to aluminum/arsenic, is used as the selective etching solution 141.

Figure 18:
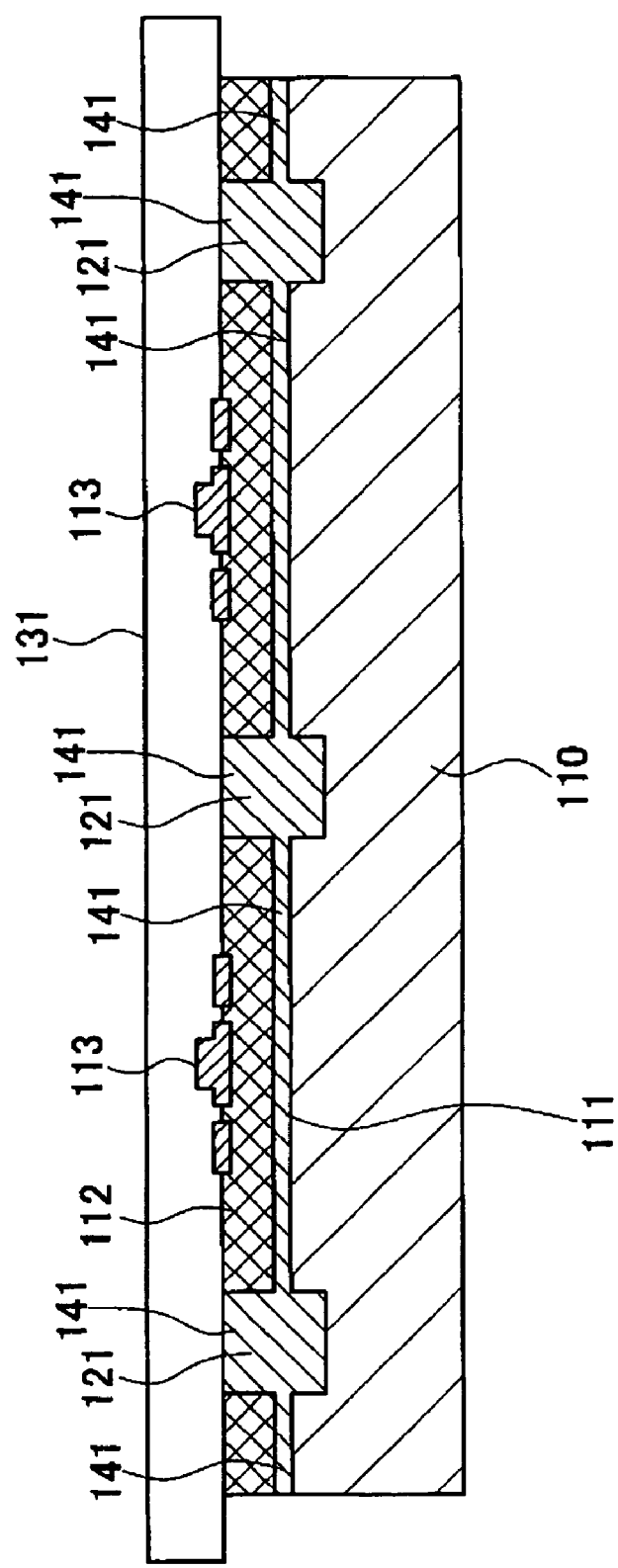
FIG. 18 is a schematic sectional view illustrating a fifth step of the exemplary fabricating method described above.

FIG. 18 is a schematic sectional view illustrating a fifth step of the exemplary method of fabricating the micro-tile shaped element. In the present step, when a predetermined time has past after injecting the selective etching solution 141 into the partitioning grooves 121 in the fourth step, the whole sacrifice layer 111 is selectively etched and removed from the substrate 110.

Figure 19:
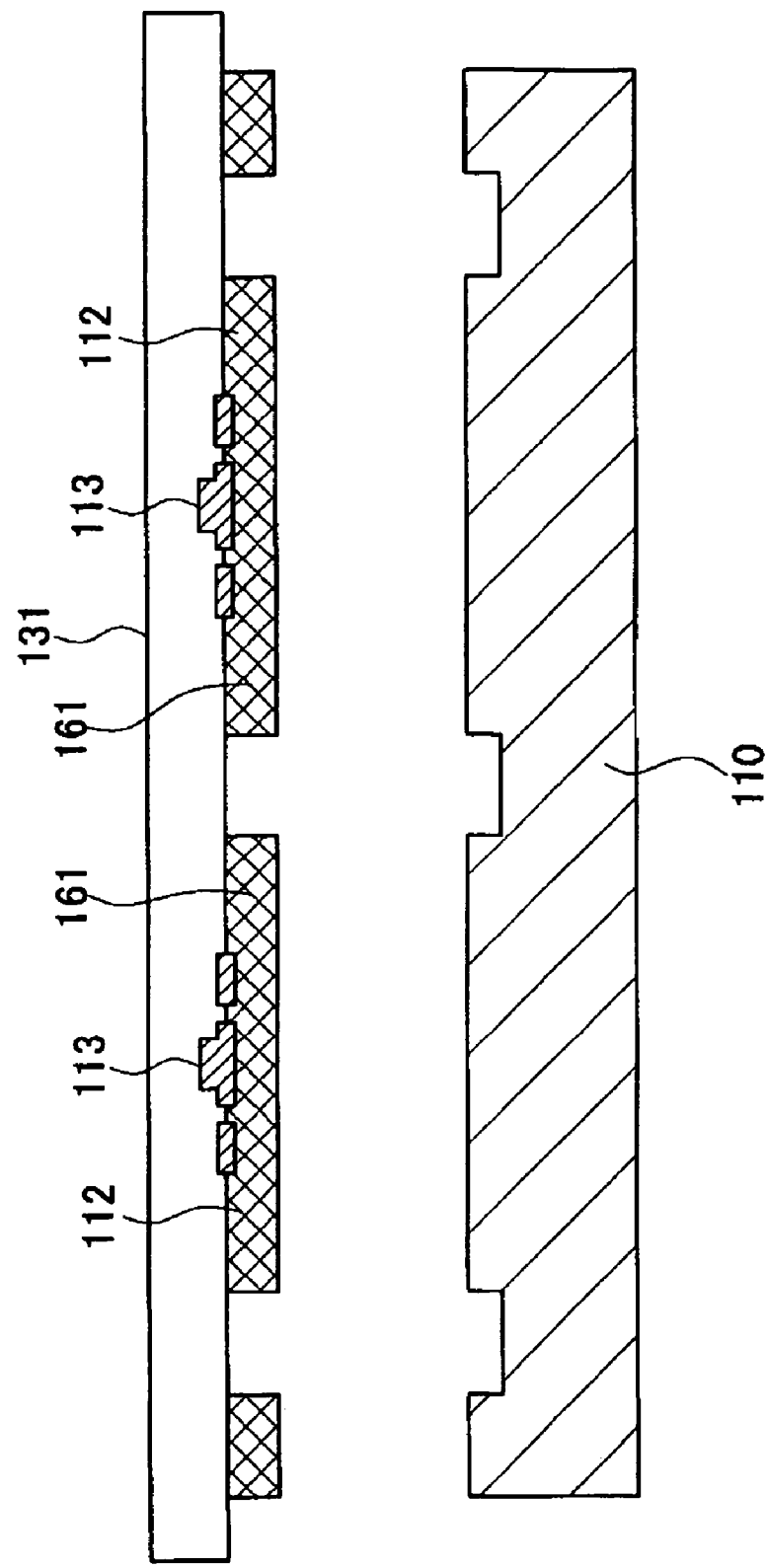
FIG. 19 is a schematic sectional view illustrating a sixth step of the exemplary fabricating method described above.

FIG. 19 is a schematic sectional view illustrating a sixth step of the exemplary method of fabricating the micro-tile shaped element. The entire sacrifice layer 111 is etched in the fifth step, and then the function layer 112 is detached from the substrate 110. Then, in the present step, the function layer 112, to which the intermediate transfer film 131 is attached, is detached from the substrate 110 by detaching the intermediate transfer film 131 from the substrate 110.

As a result, by forming the partitioning grooves 121 and etching the sacrifice layer 111, the function layer 121, in which semiconductor devices 113 are formed, is segmented to be a semiconductor device ("micro-tile shaped element" of the aforementioned exemplary embodiment) having a desired shape (e.g., micro-tile shape) and the semiconductor device is held attached to the intermediate transfer film 131. Herein, it is desirable that the function layer should have a thickness of, for example, 1 to 8 µm and a size (length and width) of, for example, several ten to several hundred micrometers.

Figure 20:
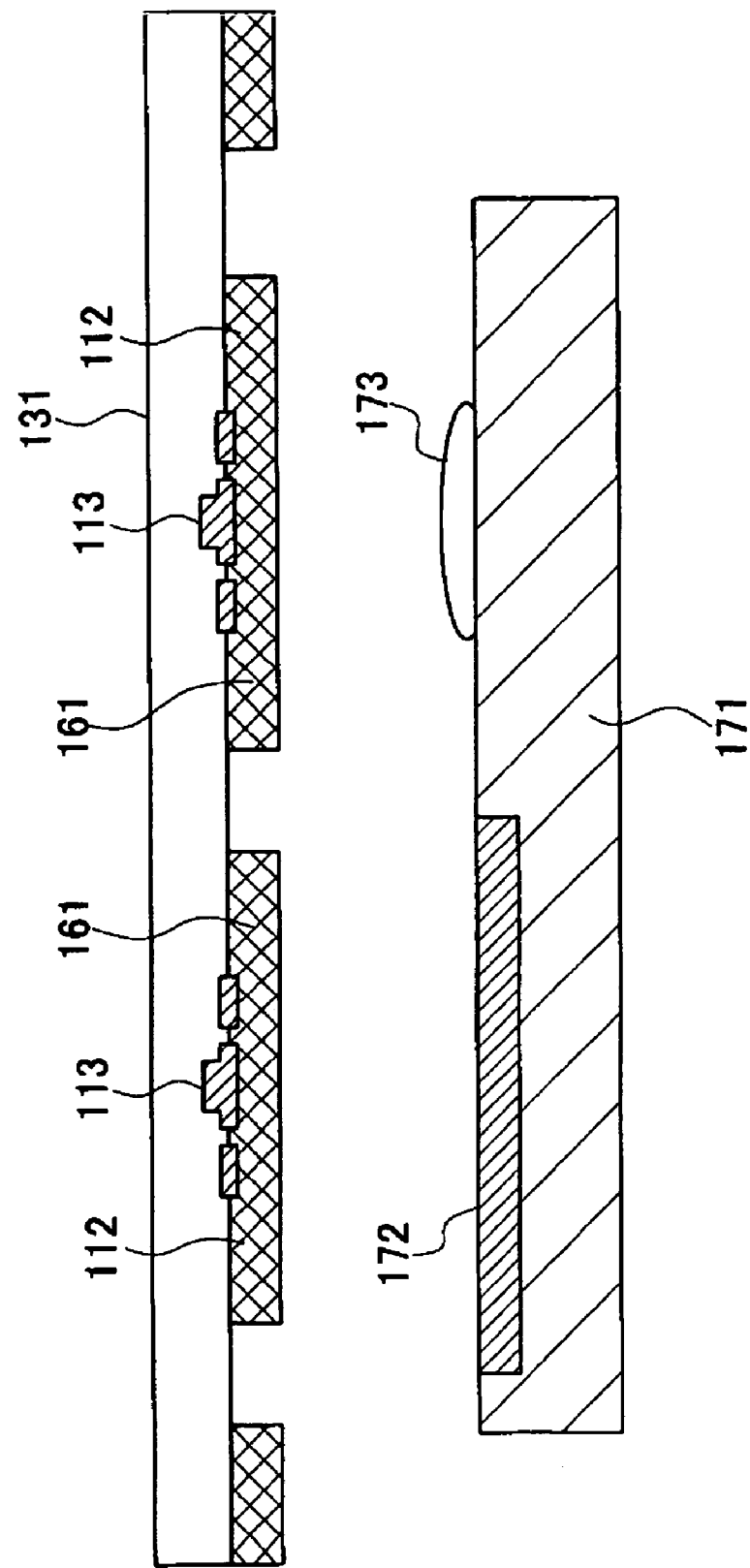
FIG. 20 is a schematic sectional view illustrating a seventh step of the exemplary fabricating method described above.

FIG. 20 is a schematic sectional view illustrating a seventh step of the exemplary method of fabricating the micro-tile shaped element. In the present step, the intermediate transfer film 131 (to which micro-tile shaped elements 161 are attached) is moved so as to align the micro-tile shaped element 161 with a desired region of a final substrate 171. Herein, the final substrate 171 is composed of, for example, a silicon semiconductor (the substrate 10 shown in FIG. 1), and an LSI region 172 is formed therein. Further, an adhesive 173 to attach the micro-tile shaped elements 161 is previously applied to the desired region on the final substrate 171.

Figure 21:
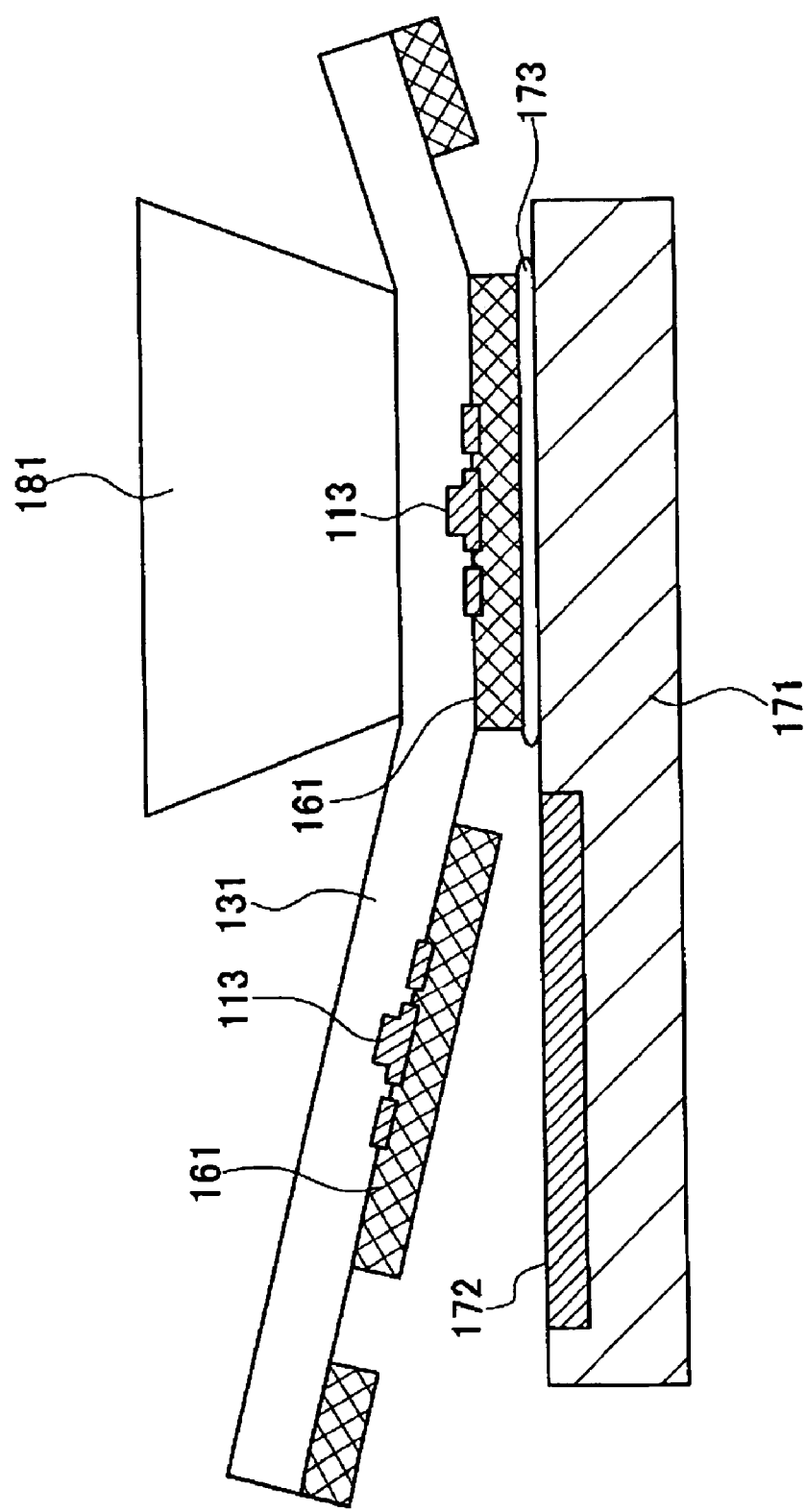
FIG. 21 is a schematic sectional view illustrating an eighth step of the exemplary fabricating method described above.

FIG. 21 is a schematic sectional view illustrating an eighth step of the exemplary method of fabricating the micro-tile shaped element. In the present step, micro-tile shaped elements 161, which are aligned with the desired portion of the final substrate 171, are pressed by a pin 181 through the intermediate transfer film 131, thereby to be adhering to the final substrate 171. Herein, because the adhesive 173 is applied to the desired portion, the micro-tile shaped elements 161 are attached to the desired portion of the final substrate 171.

Figure 22:
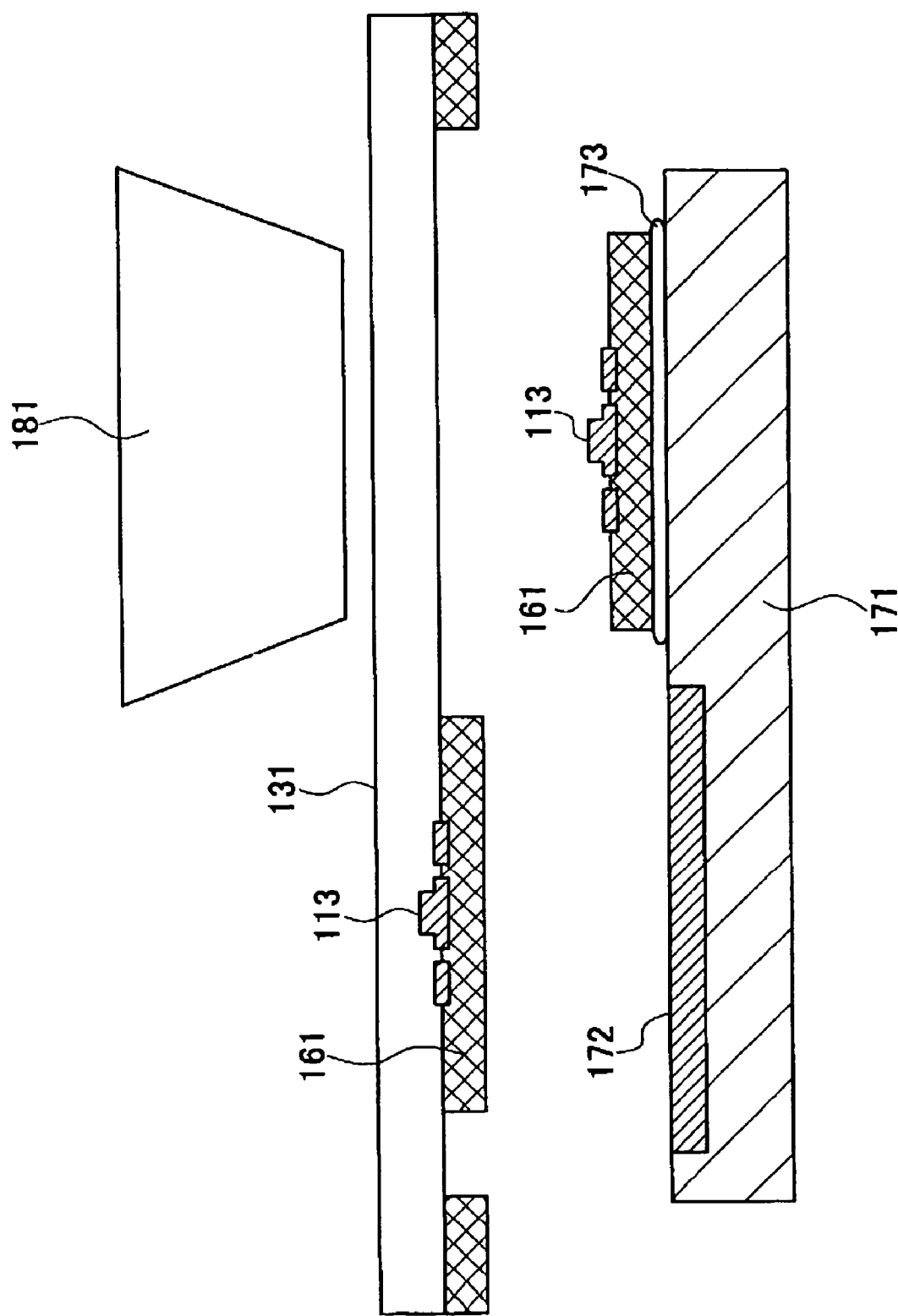
FIG. 22 is a schematic sectional view illustrating a ninth step of the exemplary fabricating method described above.

FIG. 22 is a schematic sectional view illustrating a ninth step of the exemplary method of fabricating the micro-tile shaped element. In the present step, the micro-tile shaped elements 161 are detached from the intermediate transfer film 131 by vanishing the adhesion of the intermediate transfer film 131.

The adhesive for the intermediate transfer film 131 is adapted to vanish its adhesion by UV light or heat. When using an adhesive having UV curable characteristics, the pin 181 is made of a transparent material, and UV light is radiated from the front end of the pin 181 to vanish the adhesion of the intermediate transfer film 131. When using an adhesive having thermosetting characteristics, it is preferable to heat the pin 181. Alternatively, after the sixth step, UV light may be radiated to the entire surface of the intermediate transfer film 131 to totally vanish the adhesion. Although the adhesion is vanished, in fact, adhesiveness slightly remains. Since the micro-tile shaped elements 161 are very thin and light, the micro-tile shaped elements 161 are held attached to the intermediate transfer film 131.

The present step is not shown. In the present step, the micro-tile shaped elements 161 are attached to the final substrate 171 by a thermal processing or the like.

Figure 23:
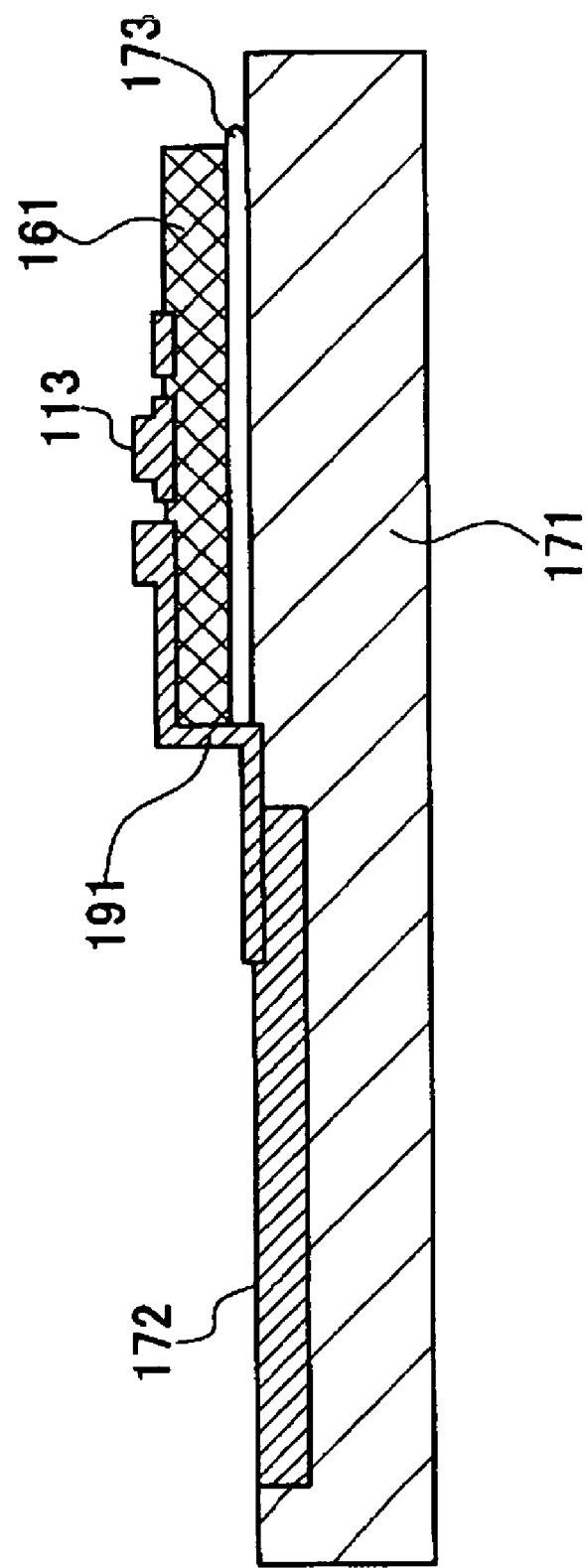
FIG. 23 is a schematic sectional view illustrating an eleventh step of the exemplary fabricating method described above.

FIG. 23 is a schematic sectional view illustrating an eleventh step of the exemplary method of fabricating the micro-tile shaped element. In the present step, an electrode of the micro-tile shaped element 161 is electrically connected through wiring 191 to circuits on the final substrate 171 to form one LSI chip (an integrated circuit chip for an optical interconnection circuit) or the like. A quartz substrate or a plastic film, as well as a silicon semiconductor, may be used as the final substrate 171.

Example of Application

Hereinafter, an example of the application of the optical interconnection circuit according to an aspect of the present invention is described.

For example, the on-chip optical interconnection circuits of the above-described exemplary embodiments are used as signal transmission device optoelectronics integrated circuit system. A computer is an example of the optoelectronics integrated circuit system. Integrated circuits constituting a CPU are formed on the substrate 10 as TFT circuits, and integrated circuits constituting a storage device are formed on the substrate 10 as TFT circuits. Although signal processing in the integrated circuits constituting the CPU or the like is performed using electrical signals, the on-chip optical interconnection circuit of the above-described exemplary embodiments is applied to the data transmission between such TFT circuits.

As a result, in accordance with the present application example, it is possible to greatly enhance the signal transmission speed of bus, which is a bottleneck in a computer processing speed, as compared with the related art, with a simple and easy configuration. Further, according to the present application example, it is possible to make a computer system or the like thinner and smaller to a great extent.

Electronic Apparatus

An electronic apparatus having a flat panel display or an on-chip optical interconnection circuit of the above-described exemplary embodiments is described.

Figure 24:
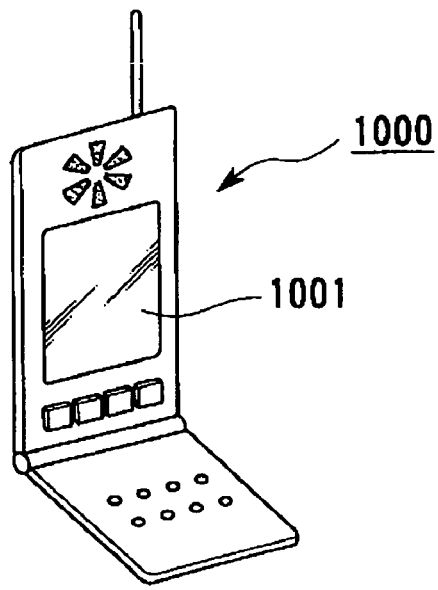
FIG. 24 is a view illustrating an example of an electronic apparatus including the circuit according to the present exemplary embodiment.

FIG. 24 is a perspective view illustrating an example of a cellular phone. In FIG. 24, reference numeral 1000 represents a body of a cellular phone using the above-described on-chip optical interconnection circuit, and reference numeral 1001 represents a display part using the above-described flat panel display device (an electro-optical device).

Figure 25:
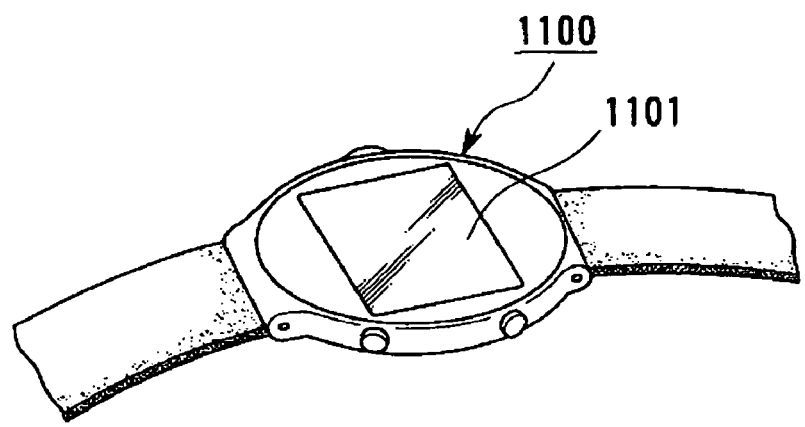
FIG. 25 is a view illustrating an example of an electronic apparatus including the circuit according to the present exemplary embodiment.

FIG. 25 is a perspective view illustrating an example of a wristwatch type electro-optical apparatus. In FIG. 25, reference numeral 1100 represents a body of a watch using the above-described on-chip optical interconnection circuit, and reference numeral 1101 represents a display part using the above-described flat panel display device (an electro-optical device).

Figure 26:
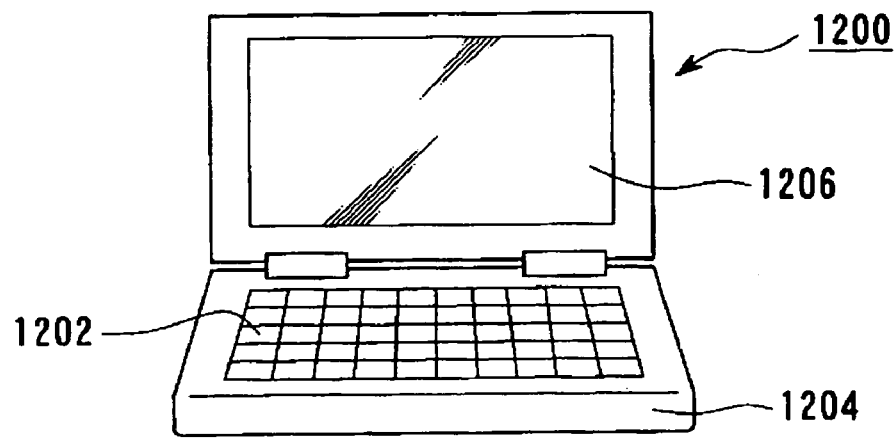
FIG. 26 is a view illustrating an example of an electronic apparatus including the circuit according to the present exemplary embodiment.

FIG. 26 is a perspective view illustrating an example of a portable information processing device, such as a word-processor or PC. In FIG. 26, reference numeral 1200 represents an information processing device, reference numeral 1202 represents an input part, such as a keyboard, reference numeral 1204 represents a body of the information processing device using the above-described on-chip optical interconnection circuit, and reference numeral 1206 represents a display part using the above-described flat panel display device (an electro-optical device).

Since the electronic apparatus shown in FIGS. 24 to 26 have the above-described on-chip optical interconnection circuit or the above-described flat panel display, it is possible to achieve electronic apparatus, each having a display part with a high display quality, high response speed, and a bright and large screen. Further, as compared with the related art, it is possible to achieve a thinner and smaller electronic apparatus by using the above-described on-chip optical interconnection circuit. Moreover, it is possible to reduce manufacturing costs by using the above-described on-chip optical interconnection circuit.

Further, the scope of the invention is not limited to the above-described exemplary embodiments, and various modifications can be made without departing from the spirit of the present invention. It is also intended that specific materials or configurations illustrated in the exemplary embodiments are only examples and suitable modifications can be made.

What is claimed is:

1. An on-chip optical interconnection circuit, comprising:
   a first circuit block provided on an integrated circuit chip;
   a second circuit block provided on the integrated circuit chip;
   a first element having a light emitting function provided on the first circuit block;
   a second element having a light receiving function provided on the second circuit block; and
   an optical waveguide being provided on the integrated circuit chip,
   the first circuit block being connected to the second circuit block through the optical waveguide, and
   the optical waveguide being in contact with the first element and with the second element.

2. The on-chip optical interconnection circuit according to claim 1,
   the first circuit block and the second circuit block being electrically connected to each other.

3. The on-chip optical interconnection circuit according to claim 2,
   the first circuit block and the second circuit block being electrically connected to each other through at least one metal wiring line.

4. The on-chip optical interconnection circuit according to claim 1,
   the first element electrically connected to the first circuit block and optically connected to the optical waveguide,
   the second element electrically connected to the second circuit block and optically connected to the optical waveguide.

5. The on-chip optical interconnection circuit according to claim 1,
   at least a portion of the optical waveguide covering the first element and the second element.

6. The on-chip optical interconnection circuit according to claim 1,
   at least a portion of the optical waveguide being provided on a top surface of the first circuit block and on a top surface of the second circuit block.

7. The on-chip optical interconnection circuit according to claim 1,
   at least a portion of the optical waveguide crossing at least one of the first circuit block and the second circuit block.

8. The on-chip optical interconnection circuit according to claim 1,
   at least a portion of the optical waveguide being provided to bypass the first circuit block and the second circuit block.

9. The on-chip optical interconnection circuit according to claim 1,
   the first circuit block and the second circuit block being one of a CPU, a memory circuit, a DSP, a RF amplification circuit, an image sensor, and a biosensor.

10. The on-chip optical interconnection circuit according to claim 1,
    the optical waveguide being a transmission line for data signals or clock signals.

11. The on-chip optical interconnection circuit according to claim 1,
    the optical waveguide including a light scattering frame scattering a light emitted by the first element.

12. The on-chip optical interconnection circuit according to claim 1,
    the optical waveguide including a light reflecting frame reflecting a light emitted by the first element.

13. An electro-optical device, comprising:
    the on-chip optical interconnection circuit according to claim 1.

14. An electronic apparatus, comprising:
    the on-chip optical interconnection circuit according to claim 1.

15. An on-chip optical interconnection circuit, comprising:
    a plurality of circuit blocks provided on an integrated circuit chip;
    a plurality of optical waveguides; and
    a plurality of elements having a light emitting function or a light receiving function;
    at least two of the plurality of circuit blocks being optically connected to each other through at least one of the plurality of optical waveguides,
    at least one of the plurality of elements electrically connected to at least one of the plurality of circuit blocks and optically connected to at least one of the plurality of optical waveguides;
    two or more elements of the plurality of elements provided on one of the plurality of circuit blocks, and
    at least one of the plurality of optical waveguides being provided for each of the two or more elements.

16. An on-chip optical interconnection circuit, comprising:
    a substrate;
    a plurality of integrated circuit chips being mounted on the substrate;
    a plurality of optical waveguides;
    at least one circuit block provided on each of the plurality of integrated circuit chips; and
    at least one element having a light emitting function or a light receiving function being provided on each circuit block;

the at least one circuit block being optically connected to another at least one circuit block through at least one of the plurality of optical waveguides, and the plurality of integrated circuit chips being optically connected to each other through at least one element, and at least one of the plurality of optical waveguides.

17. The on-chip optical interconnection circuit according to claim 16, the plurality of integrated circuit chips being mounted close to each other, and at least one of the plurality of integrated circuit chips being electrically connected to another one of the plurality of integrated circuit chips.

18. An optical interconnection circuit, comprising:
a first circuit block;
a second circuit block;
a first element having a light emitting function provided on the first circuit block;
a second element having a light receiving function provided on the second circuit block; and
an optical waveguide to optically connect the first circuit block and the second circuit block to each other.

19. The optical interconnection circuit according to claim 18, the first circuit block and the second circuit block being electrically connected to each other through at least one metal wiring line.

20. The optical interconnection circuit according to claim 18, the first element being in contact with the optical waveguide and being provided between the first circuit block and the optical waveguide, and the second element being in contact with the optical waveguide and being provided between the second circuit block and the optical waveguide.

21. The optical interconnection circuit according to claim 18, each of the first circuit block and the second circuit block being one of a CPU, a memory circuit, a DSP, a RF amplification circuit, an image sensor, and a biosensor.

* * * * *